US008759678B2

(12) United States Patent
Filatov

(10) Patent No.: US 8,759,678 B2
(45) Date of Patent: Jun. 24, 2014

(54) CABLE STORAGE DEVICE AND ASSOCIATED METHODS

(76) Inventor: Alexander Filatov, Brooklyn, NY (US)

( * ) Notice: Subject to any disclaimer, the term of this patent is extended or adjusted under 35 U.S.C. 154(b) by 227 days.

(21) Appl. No.: 13/337,138

(22) Filed: Dec. 25, 2011

(65) Prior Publication Data

US 2013/0161067 A1   Jun. 27, 2013

(51) Int. Cl.
*H02G 3/04* (2006.01)
*H04Q 1/06* (2006.01)

(52) U.S. Cl.
CPC .............. *H02G 3/04* (2013.01); *H02G 3/0406* (2013.01); *H04Q 1/06* (2013.01)
USPC ........ 174/68.1; 174/68.3; 174/135; 248/68.1; 248/74.2; 385/135

(58) Field of Classification Search
CPC ..... H02G 3/04; H02G 3/0406; H02G 3/0418; H02G 3/0437; H02G 3/10; H02G 3/105; H02G 3/22; H02G 3/24; H02G 3/26; H02G 3/263; H02G 3/28; H02G 3/30; H02G 3/36; H04Q 1/06
USPC ..... 174/50, 72 A, 135, 68.1, 68.3, 70 C, 101; 248/68.1, 71, 51, 74.2, 205.8; 385/134, 385/135
See application file for complete search history.

(56) References Cited

U.S. PATENT DOCUMENTS

| | | |
|---|---|---|
| 3,796,304 A | 3/1974 | Blais et al. |
| 4,721,268 A | 1/1988 | Lerner et al. |
| 4,742,979 A | 5/1988 | Syversten et al. |
| 5,600,098 A | 2/1997 | Kazaks |
| 6,059,215 A | 5/2000 | Finnis |
| 6,360,051 B1 | 3/2002 | Daoud |
| 6,567,601 B2 * | 5/2003 | Daoud et al. ................. 385/135 |
| 6,572,058 B1 | 6/2003 | Gerardo |
| 6,607,169 B1 | 8/2003 | Gershfeld |
| D488,054 S | 4/2004 | Myers |
| 7,041,897 B2 * | 5/2006 | Herzog ........................ 174/68.3 |
| 7,188,814 B2 | 3/2007 | Davis |
| 7,417,188 B2 * | 8/2008 | McNutt et al. ............... 174/68.1 |
| 7,446,260 B2 * | 11/2008 | Hammonds ................... 174/135 |
| 7,607,618 B2 * | 10/2009 | Mori et al. .................... 248/68.1 |
| 7,622,673 B2 * | 11/2009 | Quijano .......................... 174/50 |
| 7,700,877 B2 * | 4/2010 | Delfosse et al. ............ 174/72 A |
| 7,712,709 B2 | 5/2010 | Winchester |
| 7,891,614 B2 | 2/2011 | Czajor |
| 7,952,027 B2 * | 5/2011 | Grelck ........................ 174/72 A |
| 7,963,486 B2 * | 6/2011 | Wilson et al. ............... 174/72 A |
| 2010/0264279 A1 | 10/2010 | Allen |
| 2011/0147542 A1 | 6/2011 | Hoek |

OTHER PUBLICATIONS

Monoprice Hoop and Loop Fastening Cable Ties, available at http://www.monoprice.com/products/product.asp?c_id=105&cp_id=10520&cs_id=1052003&p_id=5809&seq=1&format=2 (2011).
Pomona Electronics Test Lead Holder for Wires, available at http://www.pomonaelectronics.com/?i=prodmain&getDetails=1&parent=TSTLEADHLDR (2011).
AAACME Rubber Co., "U" Channels With Bulbs, available at http://www.acmerubber.com/ubulbs.htm (2011).
ThinkGeek, CableClip Cable Storage, available at http://www.thinkgeek.com/homeoffice/d772/ (2011).

* cited by examiner

*Primary Examiner* — Angel R Estrada

(57) ABSTRACT

Exemplary embodiments are directed to cable storage devices and associated methods. The exemplary cable storage device includes at least one chamber and at least one chamber path. The at least one chamber path detachably secures at least one cable in the at least one chamber path. The at least one chamber is configured and dimensioned to have at least one of a spring-like property or a flexible property. An alternative exemplary cable storage device includes at least one chamber and at least one coupling member. The coupling member detachably secures at least one cable in the at least one chamber path and further includes a first coupler and a second coupler having at least one of a spring-like property or a flexible property. In alternative exemplary embodiments, methods of cable storage are provided.

20 Claims, 15 Drawing Sheets

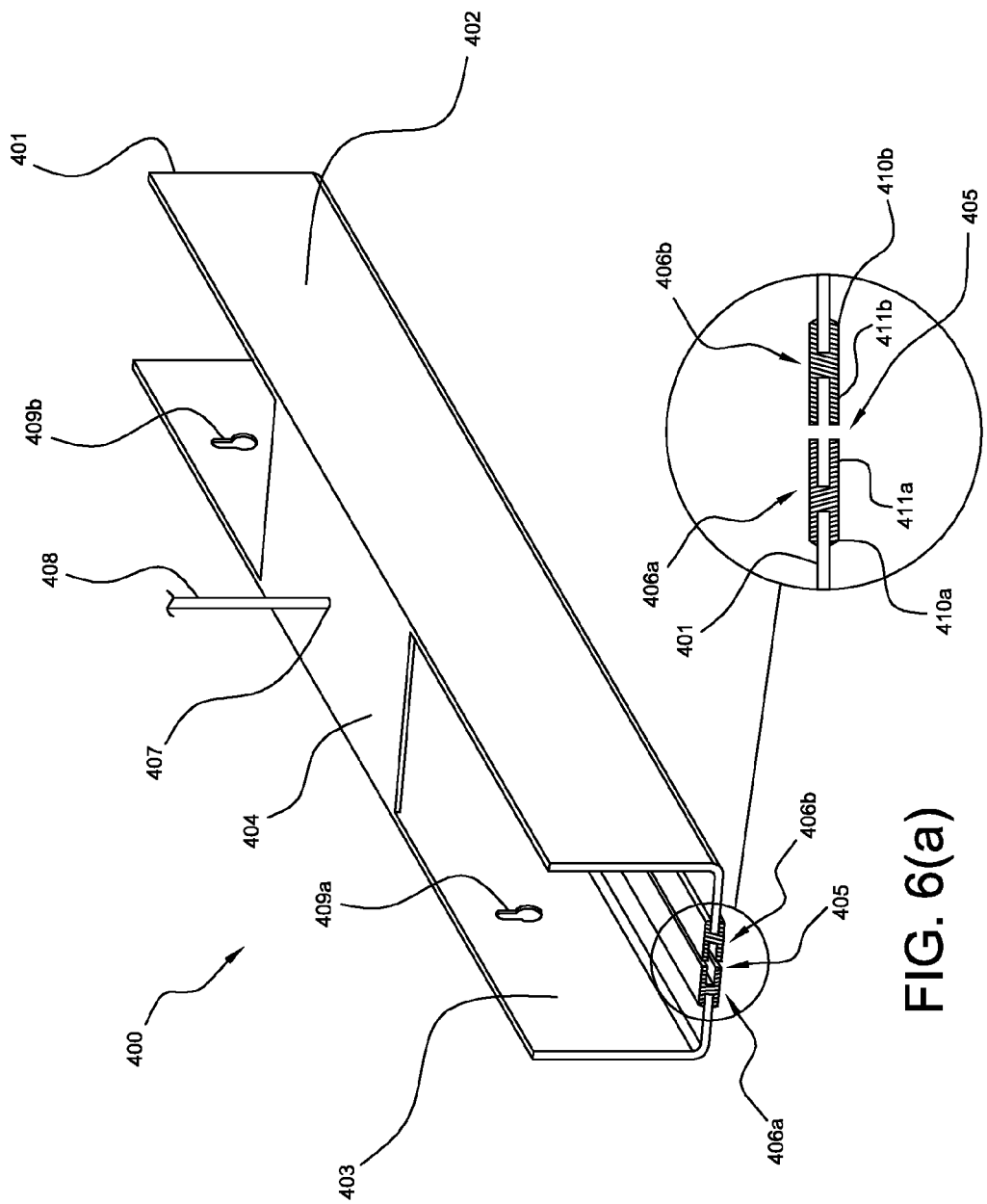

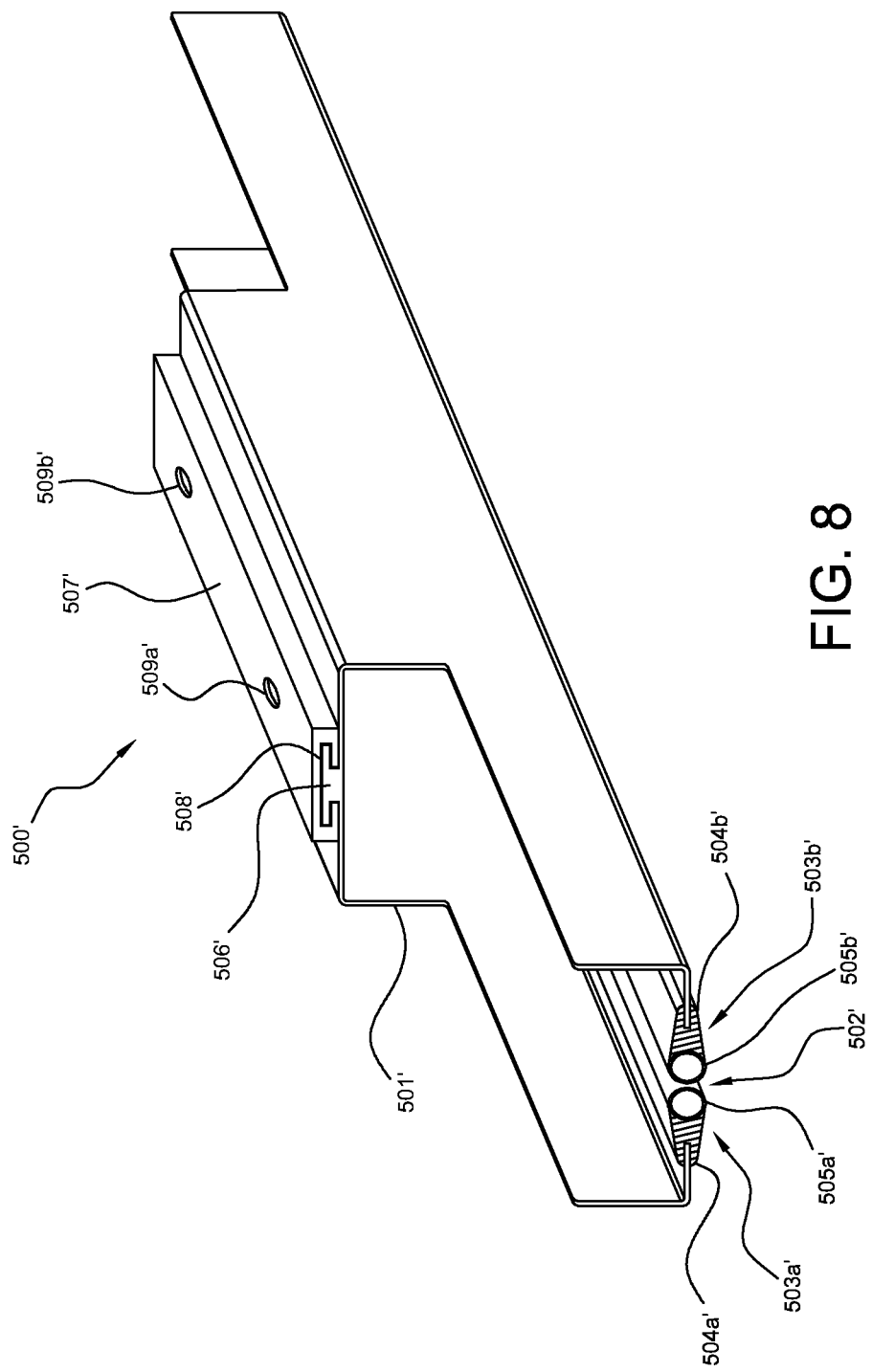

CABLE STORAGE DEVICE AND ASSOCIATED METHODS

TECHNICAL FIELD

The present disclosure relates to a cable storage device and associated methods and, in particular, to a cable storage device providing a convenient and cost efficient way of organizing and/or storing a plurality of cables.

BACKGROUND

With the vast developments in technology over the past few decades, it is common for households and/or businesses to have a large number of electric devices, e.g., cameras, e-readers, tablets, TVs, DVD players, computers, and the like. However, with the increase in technological devices, the number of cables associated with the electrical devices has increased as well. Such cables include, but are not limited to, e.g., wires, power adapters, printer connector cables, USB cables, and the like. A common disadvantage associated with acquiring the plurality of cables is the lack of a fast, convenient and cost efficient way of organizing and storing the cables.

In general, cables collected in a household and/or business are stored in, e.g., bags and/or drawers, whereby the different types of cables are mixed together and become tangled, making it extremely difficult to locate and remove a specific cable. Further, even if cables of the same type are stored in the same bags and/or drawers, the mixing and/or tangling of cables still results in a time consuming and frustrating process of removing one cable. Of particular importance is the fact that storing cables in the current methods utilized further prevents the owner/user of the cables from knowing what types of cables are in their possession.

Due to the inconvenience of storing a plurality of cables, it has become common for people to implement, e.g., boxes, Ziploc™ bags, cable ties, or the like, in an attempt to organize cables in a more structured manner. However, these methods also have their disadvantages. For example, storage of cables in boxes creates the same problems as those discussed with respect to storing cables in bags and/or drawers, i.e., cables can become tangled and/or mixed together, making it difficult to locate a specific cable and/or know what cables are in possession of the owner. Ziploc™ bags have also been used to either hold one and/or a plurality of cables which have been, for example, rolled/wound into a more manageable form. In addition and/or in combination with the use of Ziploc™ bags, cables ties have been used to bind the cables to prevent tangling (see, e.g., Monoprice Hoop and Loop Fastening Cable Ties, available at http://www.monoprice.com/products/product.asp?c_id=105&cp_id=10520&cs_id=1052003&p_id=5809&seq=1&format=2 (2011)). However, the use of Ziploc™ bags and cable ties still requires that the separated cables be placed in a container, e.g., a box, bag, drawer, or the like, for storage. Such storage again creates a disorganized and inconvenient method of locating a specific cable, i.e., a cable with specific connectors, is generally space consuming, and requires a user to search through the immense collection of bound cables until the proper cable is found. Thus, cable storage generally still remains inconvenient and time consuming to the regular and/or technical user.

As a result of the deficiencies in cable storage, various cable storage devices have been developed as an attempt to create an acceptable solution. Nevertheless, these cable storage devices have their own deficiencies. For example, cable storage and/or holder "brackets" attach to, e.g., a wall, and allow cables to be inserted into the slots provided (see, e.g., Pomona Electronics Test Lead Holder for Wires, available at http://www.pomonaelectronics.com/?i=prodmain&getDetails=1 &parent=TSTLEADHLDR (2011)). However, the slots for inserting cables are generally of only one size, therefore preventing the storage of multiple-sized cables. Also, in order to remove the cable first inserted into a specific slot, all other cables subsequently inserted into the same slot must be removed so that the specific cable of interest may be removed. Further, cables have a tendency of falling out of the slots if too many cables have been inserted into one slot, since there is generally no structure locking the cables in the slots, and a wall and/or surface must be dedicated to the "bracket" since it must be fixedly attached to a wall and/or object for use.

Cable organizers and/or storage devices similar to U.S. Patent Publication No. 2010/0264279 also require a large space to be dedicated to the storage of cables, i.e., a place to hang and/or attach the cable storage device, and make it difficult to locate a specific cable. In particular, a search and/or manipulation of each bound cable generally must be made to determine the type of connectors at the end of each cable. Thus, the process of locating a particular cable of interest is still time consuming and inconvenient.

Accordingly, despite the developments in cable storage, a need remains for a fast, convenient, cost efficient and portable cable storage device. These and other needs are satisfied by the cable storage device and the associated methods disclosed herein.

SUMMARY

In one embodiment, the present disclosure provides an exemplary cable storage device, generally including at least one chamber and at least one chamber path, wherein the at least one chamber detachably secures at least one cable. In particular, the at least one chamber can be detachably secured to at least one of, e.g., a wall, a closet rod, a shelf, or the like. The at least one chamber can further detachably secure the at least one cable in the at least one chamber path and is configured and dimensioned to house at least one of a first connector and a second connector of the at least one cable.

In addition, the at least one chamber of the exemplary cable storage device can further be configured and dimensioned to have, e.g., a spring-like property, a flexible property, elastic memory, or the like, due to the material of fabrication utilized. The at least one chamber can be fabricated from, e.g., a plastic, a metal, a silicone, or the like. As would be understood by those of ordinary skill in the art, the gauge and/or thickness of the material would correspond accordingly to the material implemented, thereby permitting the sides of at least one chamber to bend and/or flex apart slightly and create a wider opening of the chamber path due to the, e.g., the spring-like and/or flexible property, yet being sufficiently stiff so as to detachably and securely capture and/or hold the at least one cable. Specifically, the at least one cable is detachably secured in a substantially perpendicular orientation with respect to the at least one chamber path. The at least one chamber can further be translucent, thereby permitting a user to see the type of cables, e.g., the type of connectors, being stored in the exemplary cable storage device.

In another embodiment of the present disclosure, an exemplary cable storage device is presented, generally including at least one chamber and at least one coupling member, wherein the coupling member detachably secures at least one cable. In particular, the at least one chamber is configured and dimensioned to house at least one of a first connector and a second connector of the at least one cable. The at least one coupling member can further be configured and dimensioned as a pair of coupler members, e.g., a first coupler and a second coupler, and, more specifically, the first coupler and the second coupler may be configured in a opposing relation, may be, e.g., U-channel fittings with a flexible and/or elastic property, and may be attached to the sides/walls of the chamber. The at least one chamber may also be configured and dimensioned to have a spring-like, i.e., flexible, property.

In yet another embodiment of the present disclosure, an exemplary method of cable storage is provided. In particular, the method generally includes introducing at least one cable into at least one chamber through the at least one chamber path and detachably securing the at least one cable by the at least one chamber. The at least one chamber generally has at least one chamber path and detachably secures the at least one cable in the at least one chamber path. The at least one chamber is further configured and dimensioned to house at least one of a first connector and a second connector of the at least one cable, e.g., detachably securing the at least one cable in a substantially perpendicular orientation with respect to the at least one chamber path. In addition, the at least one chamber is configured and dimensioned to have, e.g., a spring-like and/or flexible property, and can be translucent.

In a further embodiment of the present disclosure, an exemplary method of cable storage is provided. In particular, the method generally includes introducing at least one cable into at least one chamber and detachably securing the at least one cable by the at least one coupling member of the at least one chamber. The at least one chamber generally includes at least one chamber path through which an elongated cord of the at least one cable protrudes. The at least one chamber is further configured and dimensioned to house at least one of a first connector and a second connector of the at least one cable, e.g., detachably securing the at least one cable in a substantially perpendicular orientation with respect to the at least one chamber path. In addition, the at least one chamber is configured and dimensioned to have, e.g., a spring-like and/or flexible property, and can be translucent. The at least one coupling member is generally configured as a first and second coupler member further configured as U-channel fittings and can have at least one of a spring-like and/or flexible property. Thus, the exemplary cable storage devices and associated methods provide a convenient and/or cost efficient manner of storing and/or organizing a plurality of cables.

Other objects and features of the disclosed devices and associated methods will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems/methods, reference is made to the accompanying figures, wherein:

FIGS. 6(a)-(b) are perspective and side views of alternative exemplary embodiments of a cable storage device according to the present disclosure;

FIG. 8 is a perspective view of an alternative exemplary embodiment of a cable storage device with a sliding attachment according to the present disclosure;

DESCRIPTION OF EXEMPLARY EMBODIMENTS

Figure 1:
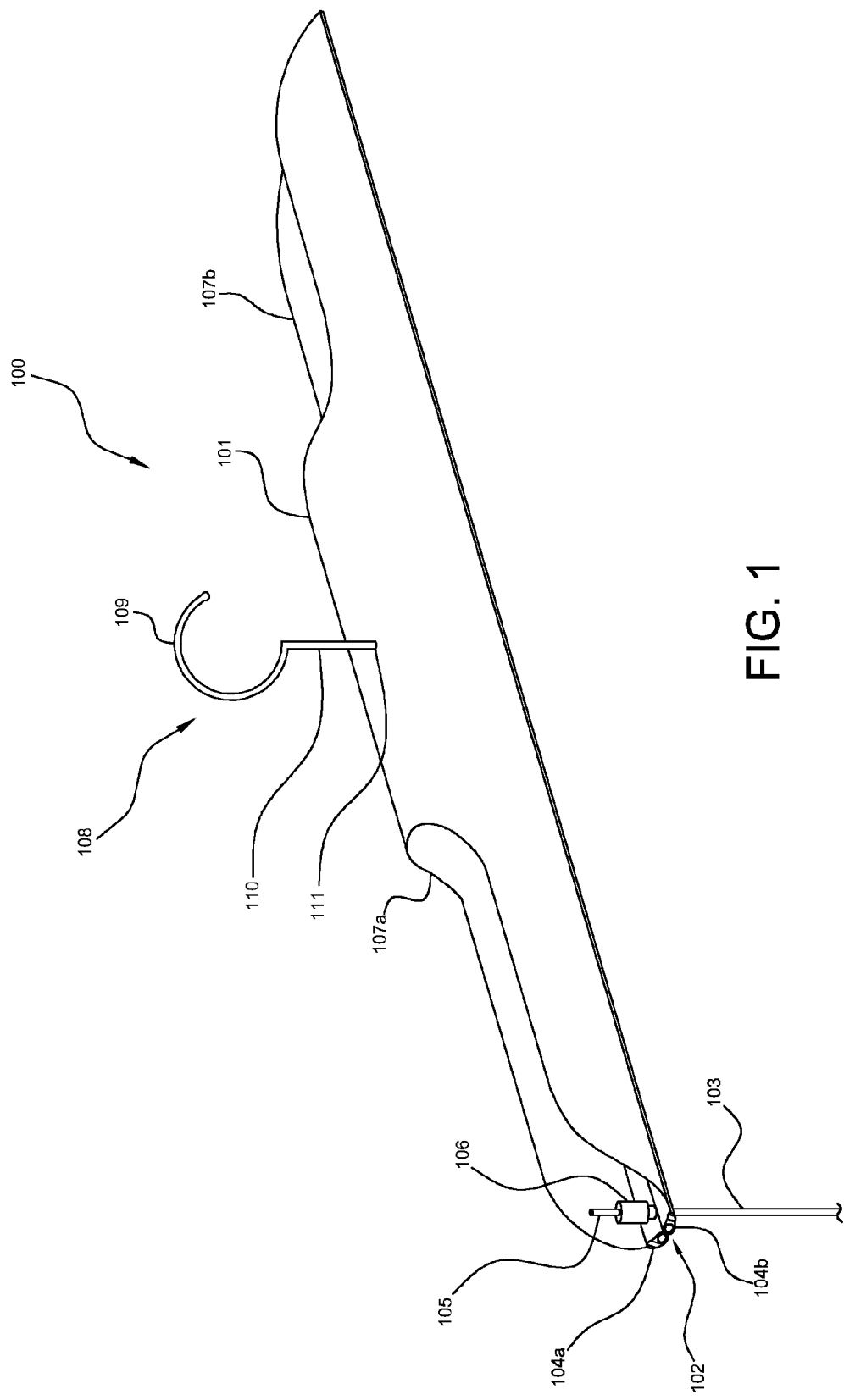
FIG. 1 is a perspective view of an exemplary embodiment of a cable storage device according to the present disclosure.

Exemplary embodiments of the present disclosure are directed to a cable storage device, generally including at least one chamber and at least one chamber path, wherein the at least one chamber detachably secures at least one cable. In particular, the at least one chamber can be detachably secured to at least one of, e.g., a wall, a closet rod, a shelf, or the like. The at least one chamber can further detachably secure the at least one cable in the at least one chamber path and is configured and dimensioned to house at least one of a first connector and a second connector of the at least one cable.

In addition, the at least one chamber of the exemplary cable storage device can further be configured and dimensioned to have, e.g., a spring-like property, a flexible property, or the like, due to the material of fabrication utilized. The at least one chamber can be fabricated from, e.g., a plastic, a metal, a silicone, or the like. As would be understood by those of ordinary skill in the art, the gauge and/or thickness of the material would correspond accordingly to the material implemented, thereby permitting the at least one chamber to bend slightly, e.g., the spring-like and/or flexible property, yet being sufficiently stiff so as to securely capture and/or hold the at least one cable. Specifically, the at least one cable is detachably secured in a perpendicular orientation with respect to the at least one chamber path. The at least one chamber can further be translucent, thereby permitting a user to see the type of cables, e.g., the type of connectors, being stored in the exemplary cable storage device.

In another embodiment of the present disclosure, an exemplary cable storage device is presented, generally including at least one chamber and at least one coupling member, wherein the coupling member detachably secures at least one cable. In particular, the at least one chamber is configured and dimensioned to house at least one of a first connector and a second connector of the at least one cable. The at least one coupling member can further be configured and dimensioned as a first coupler and a second coupler and, more specifically, the first coupler and the second coupler can be, e.g., U-channel fittings with a flexible property. The at least one chamber can also be configured and dimensioned to have a spring-like, i.e., flexible, property.

In yet another embodiment of the present disclosure, an exemplary method of cable storage is provided. In particular, the method generally includes introducing at least one cable into at least one chamber and detachably securing the at least one cable by the at least one chamber. The at least one chamber can have at least one chamber path and detachably secures the at least one cable in the at least one chamber path. The at least one chamber is further configured and dimensioned to house at least one of a first connector and a second connector of the at least one cable, e.g., detachably securing the at least one cable in a substantially perpendicular orientation with respect to the at least one chamber path. In addition, the at least one chamber is configured and dimensioned to have, e.g., a spring-like and/or flexible property and can be translucent.

In a further embodiment of the present disclosure, an exemplary method of cable storage is provided. In particular, the method generally includes introducing at least one cable into at least one chamber and detachably securing the at least one cable by the at least one coupling member of the at least one chamber. The at least one chamber generally has at least one chamber path through which an elongated cord of the at least one cable protrudes. The at least one chamber is further configured and dimensioned to house at least one of a first connector and a second connector of the at least one cable, e.g., detachably securing the at least one cable in a substantially perpendicular orientation with respect to the at least one chamber path. In addition, the at least one chamber is configured and dimensioned to have, e.g., a spring-like and/or flexible property, and can be translucent. The at least one coupling and/or coupler member is generally configured as a first and second coupler and/or coupling member further configured as U-channel fittings and can have at least one of a spring-like and/or flexible property. Thus, the exemplary cable storage devices and associated methods provide a convenient and/or cost efficient manner of storing and/or organizing a plurality of cables.

According to exemplary embodiments of the present disclosure, a cable storage device 100 is presented in FIG. 1, generally including at least one chamber 101 and at least one chamber path 102. Although depicted as only one chamber 101 including only one chamber path 102, it should be understood that multiple chambers 101 with at least one chamber path 102 each can be optionally connected together to permit a larger plurality of cables to be stored and/or organized. As should be further noted, the at least one chamber 101 can generally be fabricated from, e.g., plastic, metal, or the like, so long as the material is configured and dimensioned to have a spring-like property, e.g., flexible, resilient, elastic memory, or the like, permitting the sides of the chamber 101 on either side of the chamber path 102 to be slightly separated to widen the chamber path 102, yet sufficiently stiff to "spring" back together and engage, e.g., press together from both sides, the at least one cable. Further, although the chamber 101 is configured as substantially circular in FIG. 1, it should be understood that the chamber 101 can be configured and dimensioned in a variety of shapes, e.g., circular, square, rectangular, octagonal, a combination of same, or the like, and generally has an elongated form. The dimensions of the chamber 101 can also vary accordingly to house small cables, e.g., USB cables, patch cords, small power adapters, or the like, and large cables, e.g., large power adapters, or the like.

Still with reference to FIG. 1, the chamber 101 generally includes at least a first coupler member configured as a pair of coupler elements, e.g., a first coupler element 104a and a second coupler element 104b, connected to the sides of the chamber 101 in an opposing orientation and having the chamber path 102 therebetween. As will be discussed below in greater detail, the first and second coupler elements 104a and 104b are configured and dimensioned to secure, i.e., grip and/or hold, at least one cable, generally including an elongated cord 103, an electrical connector 105, and an insulating grip 106. As depicted in FIG. 1, the electrical connector 105 and/or the insulating grip 106 of the at least one cable are generally held by the spring-like property of the chamber 101 and/or supported by an inner surface of the chamber 101 above the first and second coupler elements 104a and 104b, thus permitting the chamber 101 to house at least one of a first connector and/or a second connector associated with a cable, while the elongated cord 103 hangs through the chamber path 102, below the chamber 101 and the first and second coupler elements 104a and 104b. Thus, a user can insert, e.g., slide, the at least one cable into the chamber path 102 from either side of the chamber 101. The spring-like property of the chamber 101 permits the chamber 101 to separate, thus creating a wider chamber path 102 which can house and/or fit an elongated cable 103 of the at least one cable. However, as discussed previously, once the at least one cable has been inserted into the chamber path 102, due to the resilient property of the chamber 101, the sides of the chamber 101 and, thus, the first and second coupler elements 104a and 104b press against and detachably secure the elongated cord 103, thereby preventing undesired detachment of the at least one cable from the cable storage device 100. Once a user desires to remove the cable of interest, the user can, e.g., slide the cable of interest out of the chamber 101 through the chamber path 102, pull down on the elongated cord 103 of the cable of interest, which in turn either widens the chamber path 102 due to the resilient property of the chamber 101 or the first and second coupler elements 104a and 104b bend, for example, cave in and/or bend in a downward direction, to permit the electrical connector 105 and the insulating grip 106 to pass through the chamber path 102 unimpeded, or the like.

The exemplary chamber 101 can further optionally include a first cutout 107a and a second cutout 107b which can be configured and dimensioned as shown in FIG. 1. However, it should be understood that the chamber 101 can include first and second cutouts 107a and 107b which are, e.g., smaller in length when viewed from the side, longer in length, have sharper angles, the chamber 101 can be fabricated without first and second cutouts 107a and 107b, i.e., substantially vertical end portions from which cables can be inserted, or the like. The first and second cutouts 107a and 107b can be included in the configuration of the chamber for, e.g., reducing the weight of the chamber 101, permitting a user to better view which types of cables are being stored by providing a clearer view of the electrical connectors 105, or the like. The chamber 101 can be configured to substantially enclose the plurality of cable connectors stored inside, thus protecting the cables from, e.g., dust particles. Although a variety of configurations of the first and second cutouts 107a and 107b of the chamber 101 are discussed herein, it should be noted that the present disclosure is not limited to such configurations and may include a variety of forms.

According to the present disclosure, exemplary chamber 101 generally includes a hanger element 108 for detachably securing the cable storage device 100 to, e.g., a wall, a closet rod, a shelf, or the like. Due to its substantially circular configuration, the chamber 101 may also attach to, e.g., a wall, by initially attaching at least two C-shaped resilient brackets (not shown) to a wall and "snapping" the chamber 101 into the C-shaped resilient brackets. In particular, the C-shaped resilient brackets can be attached vertically and perpendicularly to a wall by, e.g., screws, and the opening of the C-shaped resilient brackets can be configured and dimensioned to expand to the width of the chamber 101 to permit the chamber 101 to fit through the opening of the C-shaped resilient bracket. As should be understood by those of ordinary skill in the art, once the chamber 101 has been inserted into the opening of the C-shaped resilient brackets, the spring-like property of the C-shaped resilient member causes the arms of the C-shaped resilient brackets to "snap" around the chamber 101, thus detachably securing the chamber 101 to, e.g., a wall. In like manner, the spring-like property of the C-shaped resilient brackets permits the chamber 101 to be removed from and/or reinserted into the C-shaped resilient brackets, if necessary. However, other methods generally used in the industry for attaching a device to a wall can also be used.

As illustrated in FIG. 1, one embodiment of the exemplary hanger element 108 is substantially similar to, e.g., a hanger generally used for hanging clothing in a closet. In particular, the hanger element 108 generally includes a hook 109 for attachment to, e.g., a closet rod, and an elongated shaft 110 extending from the bottom portion of the hook 109. The elongated shaft 110 of the hanger element 108 can be utilized for connecting the hanger element 108 to the chamber 101. For example, chamber 101 can include a hanger element opening 111 passing through a portion of the chamber 101, configured and dimensioned to permit the distal end of the elongated shaft 110 to fit therethrough. The elongated shaft 110 can optionally include a threaded portion at the distal end which can, e.g., be threaded into the chamber 101 which may have matching threads, be implemented in conjunction with a nut for securing the hanger element 108 to the chamber 101, or the like.

Figure 2:
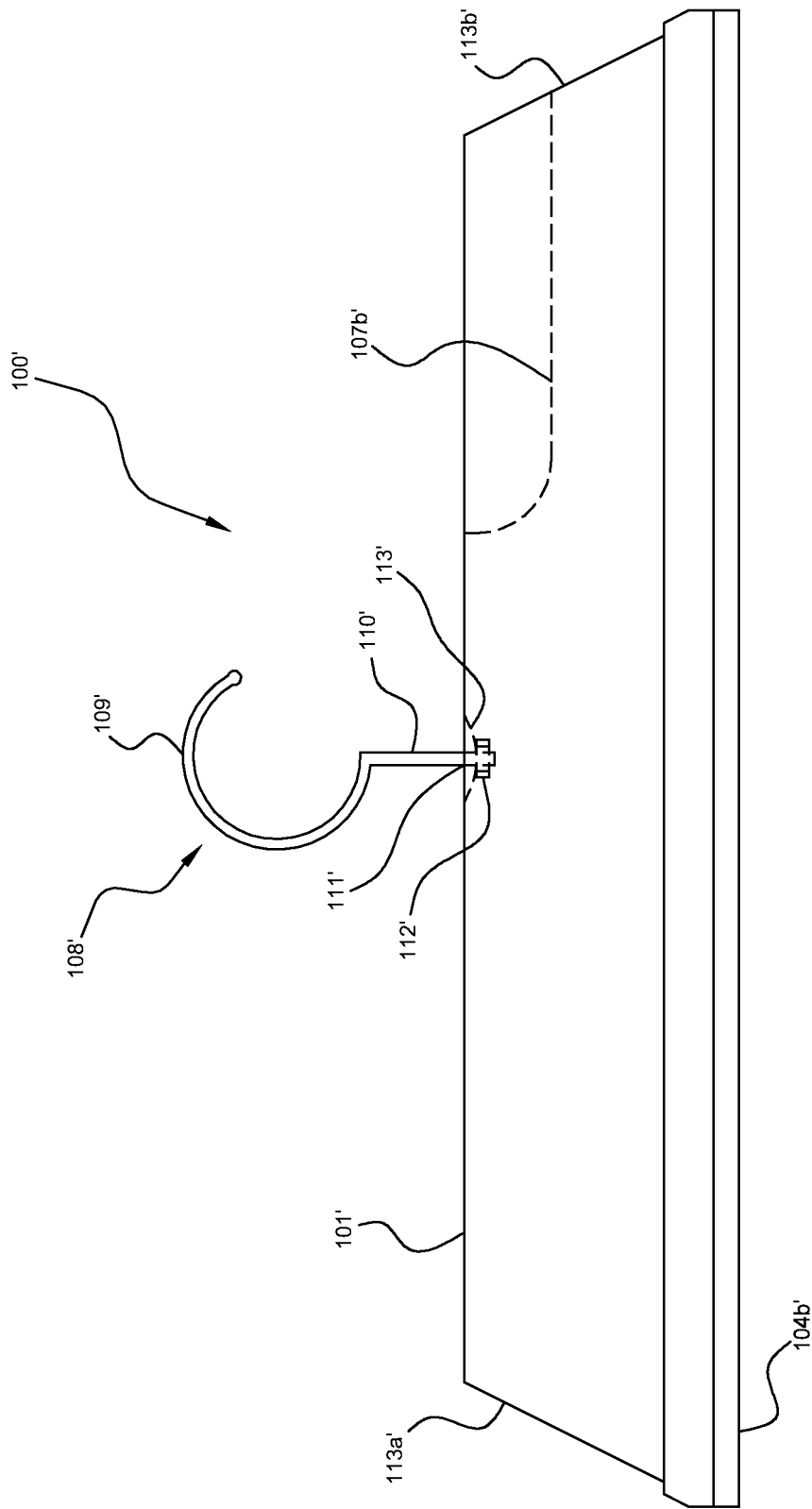
FIG. 2 is a side view of an exemplary embodiment of a cable storage device according to the present disclosure.

Turning now to FIG. 2, a side view of an exemplary embodiment of a cable storage device 100', generally including a chamber 101' and a path (not visible from the side view) is presented. In particular, the exemplary cable storage device 100' is substantially similar to the cable storage device 100 depicted in FIG. 1, generally including at least one chamber 101' and at least one chamber path (not visible from the side view). Further, the cable storage device 100' generally includes at least a first coupler member configured as a first coupler element (not shown) and a second coupler element 104b' attached to the sides of the chamber 101' in an opposing relation.

As discussed above with respect to FIG. 1, the exemplary embodiment of the cable storage device 100' can include a first cutout and a second cutout 107b'. The second cutout 107b' is illustrated in FIG. 2 as a dashed line to indicate that the first and second cutout 107b' can optionally be implemented in conjunction with the present disclosure. As would be understood, the first cutout (not shown) would be substantially equivalent, e.g., a mirror image, to the configuration and dimensions of the second cutout 107b' and may be a variety of configurations as stated previously. Further still, the exemplary cable storage device 100' can optionally be fabricated without a first and second cutout. Rather, the cable storage device 100' generally includes substantially vertical first and second chamber ends 113a' and 113b'. In particular, the first and second chamber ends 113a' and 113b' can define a surface with, e.g., an obtuse angle, acute angle, right angle, or the like, with respect to a vertical plane. For example, although the first and second chamber ends 113a' and 113b' are illustrated as obtuse angles in FIG. 2, the first and second chamber ends 113a' and 113b' may be substantially perpendicular with respect to the bottom surface of the chamber 101'.

The exemplary hanger element 108' generally includes a hook 109' and an elongated shaft 110' extending from the bottom portion of the hook 109'. As illustrated in FIG. 2, a distal end of the elongated shaft 110' may be inserted into the chamber 101' through a hanger element opening 111', e.g., a hole on the top surface of the chamber 101'. The elongated shaft 110' may further include a threaded portion on the distal end for attachment of a nut 112'. In particular, once the elongated shaft 110' has been inserted into the chamber 101' through the hanger element opening 111', a washer 113' may optionally be placed onto the elongated shaft 110' between the inner chamber 101' wall and the nut 112' for, e.g., distributing the force of the nut 112' on the inner surface of the chamber 101', preventing wear of the material, or the like, and a nut 112' with threads matching/mating to those of the elongated shaft 110' distal end may be secured to the elongated shaft 110'. The hanger element 108' can further allow rotation about the hanger element 108' vertical axis for improved access to cables of interest. Although not illustrated, it should be understood that in addition and/or as a substitute to the hanger element 108' attachment methods discussed herein, additional features, e.g., screws, washers, or the like, may be implemented for ensuring a strong connection between the hanger element 108' and the chamber 101'. Thus, the hanger element 108' can be attached to the chamber 101' for detachably securing the exemplary cable storage device 100' to, e.g., a closet rod. Due to the clothes hanger-like configuration of the exemplary cable storage device 100', when detachably secured to, e.g., a closet rod, the cable storage device 100' can further be implemented as a hanger for clothing, thereby permitting a user to hang the exemplary cable storage device 100' in a closet without losing space required for hanging extra clothing.

Figure 3:
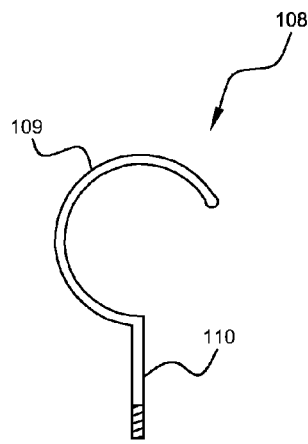
FIG. 3 is an exemplary hanger element according to the present disclosure.

Turning now to FIG. 3, an exemplary hanger element 108 of an exemplary embodiment of a cable storage device according to the present disclosure is depicted. In particular, as discussed above, the hanger element 108 typically includes a hook 109 and an elongated shaft 110. As would be understood by those of ordinary skill in the art, the hanger element 108 can be configured substantially similar to a top portion of a hanger utilized for hanging clothing in a closet. Thus, the hook 109 can be configured and dimensioned to provide a secure hold around, e.g., closet rods generally used in the industry. The elongated shaft 110 can optionally include a threaded portion at the distal end as illustrated in FIG. 3 for, e.g., screwing the elongated shaft 110 directly into a hanger element opening 111 of a chamber 101, inserting the distal end of the elongated shaft 110 through a hanger element opening 111 and mating the threaded portion with a nut 112 having matching threads on the inner portion of the chamber 101, or the like, to attach the hanger element 108 to the chamber 101.

Figures 4A, 4B:
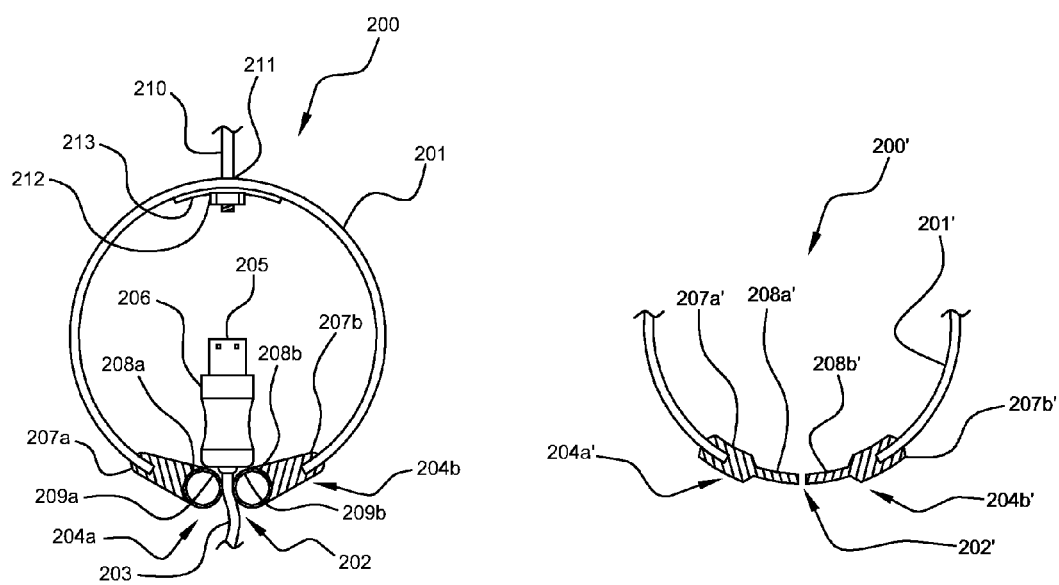
FIGS. 4(a) and (b) are side views of exemplary embodiments of a coupler member of a cable storage device.

With reference now to FIGS. 4(a) and (b), side views of exemplary embodiments of a cable storage device, including alternative embodiments of the at least one coupler member, are illustrated. It should be noted that the coupler members discussed herein are merely exemplary illustrations and, thus, the present disclosure should not be limited to the discussed configurations. In particular, FIG. 4(a) depicts an exemplary cable storage device 200, generally including at least one chamber 201, illustrated as a substantially circular chamber 201, and at least one chamber path 202. As discussed above, the chamber 202 may be attached to a hanger element, the elongated shaft 210 of which is visible at the top of FIG. 4(a).

The elongated shaft 210 penetrates the top portion of the chamber 201 through a hanger element opening 211 in the chamber 201 and is secured to the chamber 201 by a nut 212, including an optional washer 213 between the inner surface of the chamber 201 and the nut 212.

The exemplary cable storage device 200 further generally includes at least one coupler member configured as a first coupler element 204a and a second coupler element 204b attached to the sides of the chamber 201. As illustrated in FIG. 4(a), the first and second coupler elements 204a and 204b may be, e.g., U-channels with bulbs and may be fabricated from, e.g., a silicone, a rubber, or the like, having specific flexibility and/or stiffness properties (see, e.g., AAACME Rubber Co., "U" Channels With Bulbs, available at http://www.acmerubber.com/ubulbs.htm). In particular, the first and second coupler elements 204a and 204b generally include a first and second U-channel 207a and 207b for attaching said elements to the chamber 201 with, e.g., adhesive, a first and second bulb 208a and 208b, and a first and second inner passage 209a and 209b, respectively.

As illustrated in FIG. 4(a), the elastic, e.g., spring-like, property of the chamber 201 detachably secures at least one cable, generally including an elongated cord 203, an electrical connector 205 and an insulating grip 206. According to methods of the present disclosure, a user may slide the at least one cable through the chamber path 202 and into the chamber 201 by, e.g., placing the electrical connector 205 and the insulating grip 206 above the first and second coupler elements 204a and 204b and sliding the elongated cord 203 between the first and second coupler elements 204a and 204b until the at least one cable is detachably secured, spreading the chamber 201 walls slightly and inserting the electrical connector 205 and the insulating grip 206 from the bottom through the widened chamber path 202, or the like. In particular, the elastic property of the chamber 201 permits the sides of the chamber 201 to be slightly bent apart, thereby increasing the width of the chamber path 202 and creating a space to fit the width of an elongated cable 203, the insulating grip 206 and/or the electrical connector 205. However, once the elongated cable 203 has been inserted into the chamber path 201, the spring-like property of the chamber 201 sides grip and/or press against the elongated cord 203, thus detachably securing the at least one cable in the chamber path 202. The elongated cord 203 can thus be secured between the first and second coupler elements 204a and 204b, while the inner surface of the chamber 201 supports and/or prevents the electrical connector 205 and/or the insulating grip 206 from passing through the chamber path 202. In addition, the elastic property of the chamber 201 results in substantially even/continuous pressure being applied to the elongated cord 203 by the first and second coupler elements 204a and 204b and along the entire length of the chamber path 202.

With specific reference to the first and second coupler elements 204a and 204b, although said elements may be attached to the chamber 201 by the first and second U-channels 207a and 207b, other methods and/or configurations generally known in the industry may be used for attaching the first and second coupler elements 204a and 204b to the chamber 201. Further, although the first and second bulbs 208a and 208b are depicted as substantially circular, it should be understood that the configuration may be, e.g., circular, hexagonal, square, rectangular, or the like. The first and second inner passages 209a and 209b generally also create a substantially hollow portion inside the entire length of the first and second bulbs 208a and 208b. As should be understood, the flexibility and/or stiffness of the first and second bulbs 208a and 208b with respect to the amount of yield, e.g., the distance the first and second bulbs 208a and 208b "cave in" due to a force applied on the first and second bulbs 208a and 208b, may vary depending on the material of fabrication and/or the thickness of the first and second bulb 208a and 208b walls, i.e., the outer diameter of the first and second bulbs 208a and 208b minus the inner diameter of the first and second inner passages 209a and 209b. Thus, a combination of the type of material of fabrication and/or the thickness of the first and second bulb 208a and 208b walls can be utilized to provide sufficient support against the elongated cord 203 and/or the insulating grip 206, while permitting sufficient yield of the material to detach the cable being stored in the cable storage device 200 when the elongated cord 203 is pulled in a downward direction and/or out of the cable storage device 200.

Still with reference to FIG. 4(a), once a user has inserted, e.g., detachably secured, at least one cable into the chamber 201, the user may detach the at least one cable by, e.g., sliding the cable out of a side of the chamber 201 through the chamber path 202, spread the chamber 201 walls slightly apart to widen the chamber path 202 to permit the electrical connector 205 and the insulating grip 206 to pass through the chamber path 202, pull on the elongated cord 203 in a direction away from the chamber path 202, thus causing the first and second bulbs 208a and 208b to yield slightly, or the like. In particular, as would be understood by one of ordinary skill in the art, the first and second bulbs 208a and 208b of the first and second coupler elements 204a and 204b may be configured and dimensioned to yield only at the portion where the insulating grip 206 and/or the electrical connector 205 of the cable of interest is located when pressure is applied on the elongated cord 203 in a direction away from the chamber path 202. Thus, although a plurality of cables may be stored in the cable storage device 200, when a user pulls on the elongated cord 203 of the cable of interest, the first and second bulbs 208a and 208b yield, e.g., cave in and/or bend inwardly, thus creating a path sufficiently wide to permit the electrical connector 205 and the insulating grip 206 of the cable of interest to pass through the chamber path 202, while maintaining a constant and sufficiently secure and/or even pressure on the remaining cables along the entire length of the chamber 201 to prevent undesired detachment of an additional cable. Once the cable of interest has been removed by the user from the cable storage device 200, the first and second bulbs 208a and 208b "spring" back to the "default" substantially circular form due to the elastic memory of the material, thus sealing the widened chamber path 202 opening created due to the force applied on the first and second bulbs 208a and 208b during the removal of the cable of interest.

Turning now to FIG. 4(b), an alternative exemplary embodiment of a cable storage device 200' is illustrated, generally including at least one chamber 201' and at least one chamber path 202'. Further, the chamber 201' includes an alternative at least one coupler member, e.g., first and second coupler elements 204a' and 204b' configured as U-channel tabs. In particular, the first and second coupler elements 204a' and 204b' generally include a first and second U-channel 207a' and 207b' and a first and second elongated tab 208a' and 208b'. Similar to the exemplary embodiment of FIG. 4(a), the first and second coupler elements 204a' and 204b' may be attached to the chamber 201 walls by the first and second U-channels 207a' and 207b' by, e.g., adhesion. In addition, similar to the first and second bulbs 208a and 208b of FIG. 4(a), the first and second elongated tabs 208a' and 208b' of the first and second coupler elements 204a' and 204b' may be configured and dimensioned to define a length and/or thickness sufficiently stiff to support the electrical connector 205 and the insulating grip 206 of at least one cable, while retaining a sufficiently flexible property to permit the at least one cable to be removed from the cable storage device 200' by pulling down on the elongated cord 203. Thus, a user may insert at least one cable into the cable storage device 200' by, e.g., sliding the electrical connector 205 and the insulating grip 206 above and through the chamber path 202', spreading the walls of the chamber 201' slightly and introducing the cable into the chamber 201' through the chamber path 202' in a substantially perpendicular orientation to the chamber path 202', or the like.

For removal of a cable of interest, the user may slide the cable out of a side portion of the chamber 201', may spread the walls of the chamber 201' to a width which would permit the electrical connector 205 and the insulating grip 206 of a cable to pass through unimpeded, pull down on the elongated cord 203 of the cable of interest, thus causing the first and second elongated tabs 208a' and 208b' to yield, or the like. Specifically, similarly to the first and second bulbs 208a and 208b, although a plurality of cables may be stored in the cable storage device 200', when a user pulls on an elongated cord 203 of the cable of interest, the first and second elongated tabs 208a' and 208b' may yield, e.g., bend in a downward direction, thus creating a wider chamber path 202' portion for the cable of interest to pass through, while maintaining a secure and/or even force distribution on the remaining cables being stored. Once the cable of interest has been removed by the user from the chamber path 202', the first and second elongated tabs 208a' and 208b' generally "spring" back to a "default" orientation, e.g., a substantially horizontal and opposing configuration, due to the elastic memory of the material of fabrication, thereby sealing the widened chamber path 202' created due to the force applied by the downwardly pulled cable of interest. It should be noted that the configuration of the first and second coupler elements 204a' and 204b' can be in an opposed spaced and/or touching relation when an elongated cord 203 is not located in the chamber path 202'.

Figure 5A:
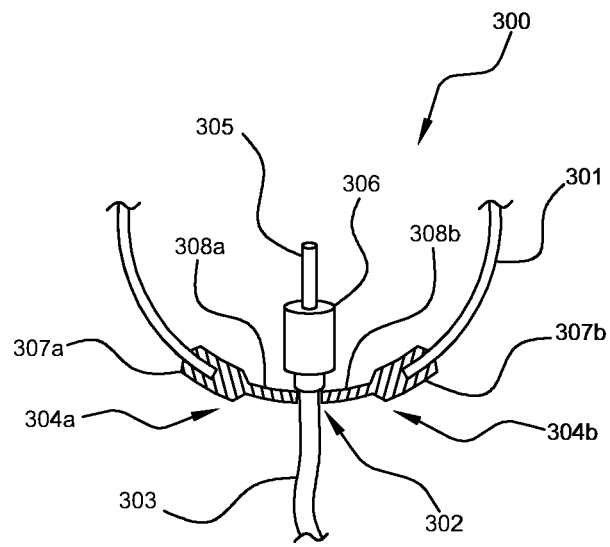
FIGS. 5(a)-(d) are side views of alternative exemplary embodiments of a coupler member of a cable storage device.

Turning now to FIGS. 5(a)-(d), side views of alternative exemplary embodiments of a coupler member of a cable storage device are provided, generally including at least one chamber and at least one chamber path. In particular, FIG. 5(a) illustrates an exemplary cable storage device 300 which is substantially similar to the cable storage device 200', including a chamber 301 configured in a substantially circular form and a coupler member configured as first and second coupler elements 307a and 307b, respectively. The first and second coupler elements 307a and 307b further include first and second U-channels 307a and 307b and first and second elongated tabs 308a and 308b for detachably securing the at least one cable. As illustrated in FIG. 5(a), generally, the electrical connector 305 and insulating grip 306 of the detachably secured cable are located above the first and second coupler elements 307a and 307b, while the elongated cord 303 is located below the first and second coupler elements 307a and 307b and connects to the insulated grip 306 through the chamber path 302. In order to remove the detachably secured cable, the user may, e.g., slide the cable out of a side opening of the chamber 301 and chamber path 302, widen the chamber path 302 by elastically spreading the chamber 301 walls slightly to permit the cable to pass unimpeded through the chamber path 302, pull down on the elongated cable 303, thereby causing the first and second elongated tabs 308a and 308b of the first and second coupler elements 304a and 304b to deflect and/or bend in a downward direction, or the like. In particular, the deflecting and/or bending in a downward direction of the first and second elongated tabs 308a and 308b widens the chamber path 302 only in the location of the cable of interest, thus permitting the cable of interest to pass through the chamber path 302 and out of the chamber 301, while maintaining a constant pressure along the remainder of the chamber path 302. The flexible yet stiff property of the first and second coupler elements 304a and 304b allows a cable of interest to be detached from the cable storage device 300, while preserving a secure hold of the additional plurality of cables being stored in the cable storage device 300.

Figure 5B:
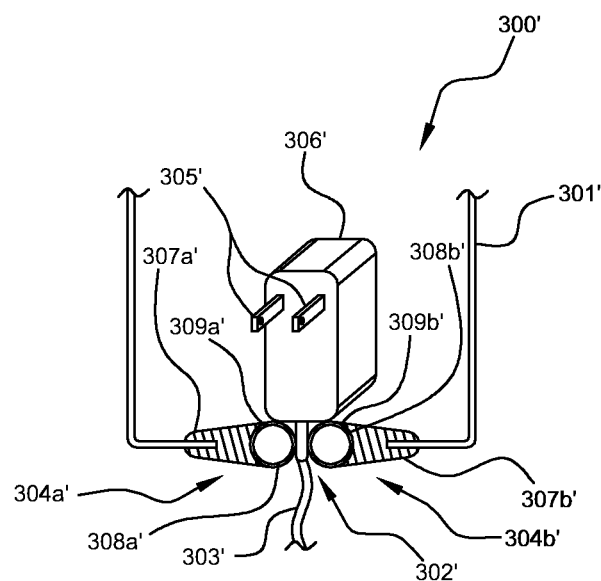

With reference to FIG. 5(b), an alternative exemplary cable storage device 300' is illustrated, generally including at least one chamber 301', depicted in a substantially square and/or rectangular configuration, and at least one chamber path 302'. As noted previously, the exemplary embodiments of the cable storage device are merely intended for illustrative purposes and, therefore, the configurations of, e.g., the chamber, chamber path, or the like, should not be considered as limitations of the present disclosure. Still with reference to FIG. 5(b), the first and second coupler elements 304a' and 304b' generally include first and second U-channels 307a' and 307b' for attachment to the walls of chamber 301' and first and second bulbs 308a' and 308b'. The first and second bulbs 308a' and 308b' further include first and second inner passages 309a' and 309b', respectively, and may be configured and dimensioned to provide a sufficiently flexible first and second bulb 308a' and 308b' which can, e.g., deflect, cave in, or the like, when a cable is being pulled downwardly and through the chamber path 302' for removal, while retaining a sufficiently stiff property for securing/supporting the insulated grip 306' and the electrical connector 305' inside the chamber 301' during storage of the cable. The elastic property of the chamber 301' presses against the elongated cord 303' with the first and second bulbs 308a' and 308b' and, particularly, the first and second bulbs 308a' and 308b' may depress slightly depending on the thickness of the elongated cord 303', while maintaining a sufficiently high pressure to prevent undesired detachment of the cable from the cable storage device 300'. As depicted in FIG. 5(b), a power adapter with a large insulating grip 306' is being stored in the exemplary cable storage device 300'. Thus, to remove the power adapter from the cable storage device 300', a user may pull down on the elongated cord 303', thereby causing the first and second bulbs 308a' and 308b' to depress and/or cave in slightly creating a widening of the chamber path 302' to a distance sufficient for passing the insulating grip 306' and electrical connector 305' unimpeded. However, the chamber 301' may further be spread slightly due to its elastic, e.g., spring-like, property to create a wider opening of the chamber path 302'.

Figure 5C:
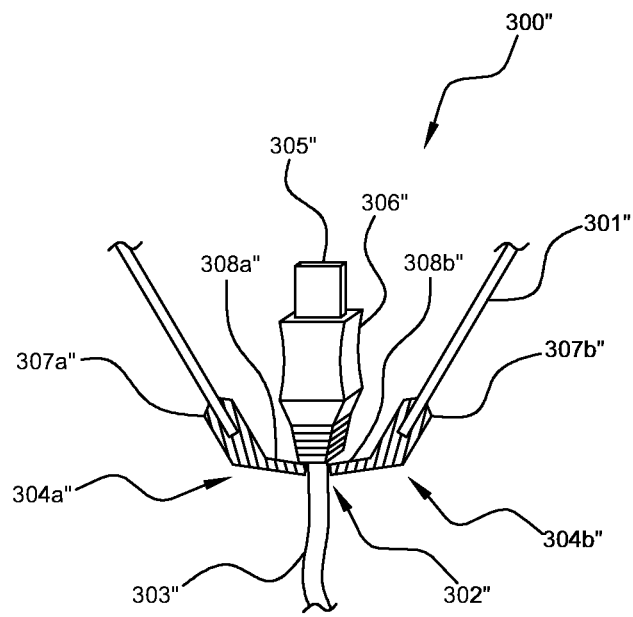

With reference to FIG. 5(c), an alternative exemplary embodiment of a cable storage device 300" is illustrated, generally including a chamber 301" configured in a substantially triangular form and a chamber path 302". It should be understood that the first and second coupler elements 304a" and 304b" of the exemplary cable storage device 300" are structured and function substantially similarly to the first and second coupler elements 304a and 304b of the exemplary cable storage device 300 as depicted in FIG. 5(a). In particular, the first and second coupler elements 304a" and 304b" further include first and second U-channels 307a" and 307b" for attachment to the chamber 301" and first and second elongated tabs 308a" and 308b" for gripping a cable of interest. The cable of interest illustrated in FIG. 5(c) may be, e.g., a USB connector, with an elongated cord 303", an insulating grip 306" and an electrical connector 305".

Figure 5D:
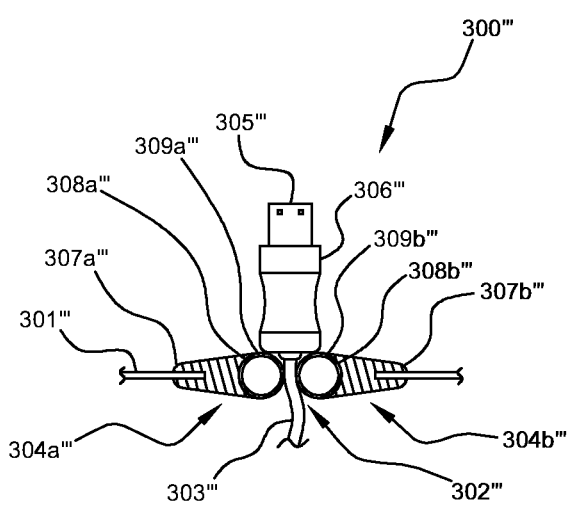

FIG. 5(d) also illustrates a USB connector detachably secured in an alternative exemplary cable storage device 300''', generally including a chamber 301''' and a chamber path 302'''. It should be understood that the first and second coupler elements 304a''' and 304b''' of the exemplary cable storage device 300''' are structured and function substantially similarly to the first and second coupler elements 304a' and 304b' of the exemplary cable storage device 300' as depicted in FIG. 5(b). In particular, the first and second coupler elements 304a''' and 304b''' further include first and second U-channels 307a''' and 307b''', first and second bulbs 308a''' and 308b''', and first and second inner passages 309a''' and 309b''' for detachably securing a cable of interest. The chamber 301''' walls have been illustrated as non-complete extensions to indicate that the walls of the exemplary chamber 301''' of the present disclosure may be extended to have a variety of configurations, e.g., circular, square, rectangular, triangular, or the like.

Turning now to FIGS. 6(a) and (b), perspective and side views of alternative exemplary embodiments of a cable storage device 400 according to the present disclosure are provided. In particular, the exemplary cable storage device 400 is substantially similar to the exemplary cable storage devices described previously, generally including at least one chamber 401, configured in a substantially square and/or rectangular form, at least one chamber path 405, and further including a first side wall 402, a second side wall 403, and a top wall 404. The top wall 404 may cover the entire top surface of the chamber 401 or may contain "cutouts" similar to those discussed with respect to FIG. 1 and shown in FIG. 6(a), thus covering only, e.g., a central portion of the top of the chamber 401 and providing greater visibility to the user of what cables are stored inside the cable storage device 400. One of the first side wall 402 or second side wall 403 can further include first and second hanging slots 409a and 409b which, as would be understood by those of ordinary skill in the art, can be fitted over, e.g., a screw, nail or the like, secured to a wall, thus detachably securing the cable storage device 400 to, e.g., a wall, cabinet or the like. The chamber 400 may also include hanger element 408 secured to the chamber 401 through a hanger element opening 407 as described previously to detachably secure the cable storage device 400 to, e.g., a closet rod.

The exemplary first coupler member of the cable storage device 400 can be configured and dimensioned as a first coupler element 406a and 406b, which function substantially similarly to the first coupler elements discussed previously. With reference to FIG. 6(b), a detailed view of the first coupler member is depicted, including a first and second U-channel 410a and 410b for attaching the first and second coupler elements 406a and 406b to the chamber 401 and first and second pairs of elongated tabs 411a and 411b. The first and second pairs of elongated tabs 411a and 411b are substantially similar to pairs of the first and second elongated tabs 308a and 308b of FIG. 5(a) in a confronting relationship around the chamber path 405 and may include a hollow path between the pairs of elongated tabs for providing additional flexibility to the first and second coupler elements 406a and 406b. Thus, when a cable of interest is pulled in a downwardly direction and out of the chamber 401 through the chamber path 405, the first and second pairs of elongated tabs 411a and 411b elastically bend in a downward direction to permit the electrical connector and insulating grip of the cable of interest to pass unimpeded. Once the cable of interest has been removed from the cable storage device 400, the first and second pairs of elongated tabs 411a and 411 "spring" back to the original, substantially horizontal configuration and maintain an evenly distributed pressure along the entire length of the chamber path 405. As stated previously, the various configurations of coupler members described herein are not intended as limitations of the types of coupler members which may be implemented in conjunction with the exemplary cable storage devices of the present disclosure. Rather, numerous configurations of coupler members may be implemented, so long the coupler member is configured and dimensioned to have substantially stiff properties to detachably secure a plurality of cables in the cable storage device, while remain substantially flexible to elastically bend and widen the chamber path when a user pulls on the elongated cord of a cable to be removed in a direction away from the chamber path.

Figure 7A:
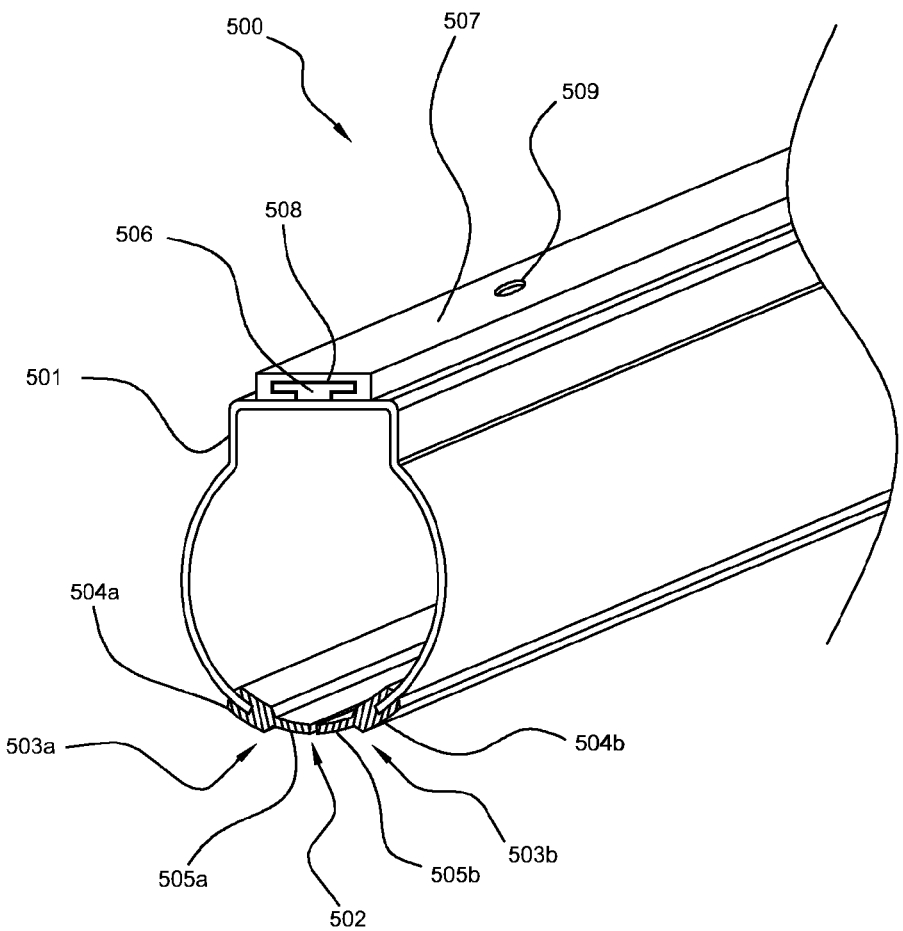
FIGS. 7(a)-(b) are perspective views of exemplary embodiments of a cable storage device with a sliding attachment according to the present disclosure.

Turning now to FIGS. 7(a) and (b), perspective views of exemplary embodiments of a cable storage device 500 with a sliding attachment are illustrated according to the present disclosure. In particular, the exemplary cable storage device 500 generally includes at least one chamber 501 configured as, e.g., a combination of a square and circular form, and at least one chamber path 502. The exemplary cable storage device 500 can further include a coupler member configured as first and second coupler elements 503a and 503b, illustrated herein as first and second U-channels 504a and 504b and first and second elongated tabs 505a and 505b.

As depicted in FIG. 7(a), the exemplary cable storage device 500 includes a sliding wall attachment, including a female attachment member 507 and a male attachment member 506. Although illustrated as having the male attachment member 506 permanently attached to a top surface of the chamber 501 and the female attachment member 507 detachable from the chamber 501 and attachable to, e.g., a wall, shelf or the like, it should be understood that the exemplary cable storage device 500 can be fabricated with a female attachment member 507 permanently attached to the top surface of the chamber 501 and the male attachment member 506 detachably secured to, e.g., a wall, shelf or the like. Further, sliding wall attachment methods generally used in the industry can be implemented in conjunction with the disclosed cable storage device 500. Therefore, as depicted in FIG. 7(a), the female attachment member 507 can be attached to, e.g., a wall, underside of a shelf, or the like, with, e.g., screws, through at least a first attachment hole 509 and a second attachment hole (not shown). The male attachment member 506, and in turn the chamber 401, can then be slid into and/or mated with a compatible slot 508 in the female attachment member 507 to detachably secure the cable storage device 500 to, e.g., a wall, shelf or the like. At least one of the male attachment member 506 and/or the female attachment member 507 can optionally include a "lock" and/or latch (not shown) for preventing undesired extraction of the male attachment member 506 out of the female attachment member 507, thus ensuring that the chamber 501 remains securely attached to a structure.

Figure 7B:
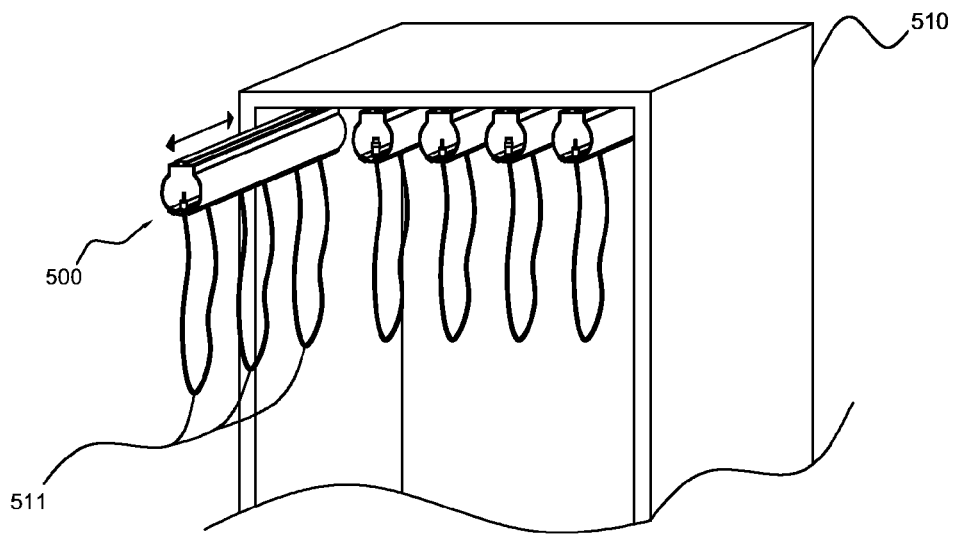

With reference to FIG. 7(b), a plurality of exemplary cable storage devices 500 are illustrated detachably secured to an inner top surface of a closet 510 by the female attachment members 507 and further detachably secure a plurality of cables 511. As described above and as depicted by the double-sided arrow, the exemplary cable storage devices 500 can generally be slid in and out of the sliding attachment member secured to a surface of, e.g., a closet 510. Thus, a user can store a plurality of cables 511 inside a storage area, e.g., a closet 510, and remove the cables of interest directly from the storage area while the chamber 501 is detachably secured to the sliding attachment member and/or the user can permanently/temporarily remove the chamber 501 out of the storage area by sliding the chamber 501 out of the sliding attachment member secured to the surface of a structure to, e.g., better visualize and/or determine which cables are being stored in the chamber 501. The potential placement of a plurality of exemplary cable storage devices 500 in a substantially grouped manner permits, e.g., a technician, to create a storage area dedicated to the storage and/or organization of a plurality of cables, while also allowing the user to remove and transport the cable storage device 500 as desired.

Turning now to FIG. 8, a perspective view of yet another alternative exemplary embodiment of a cable storage device 500' with a sliding attachment is provided according to the present disclosure. The exemplary cable storage device 500' is substantially similar to the cable storage device 500 of FIG. 7(a), generally including at least one chamber 501' configured in a substantially square and/or rectangular form and at least one chamber path 502'. The chamber 501' can optionally include cutouts as illustrated in FIG. 8, although the side portions of the chamber 501' can also be configured in a variety of angles, including, e.g., vertical sides. The cable storage device 500' generally includes a coupler member configured as first and second coupler elements 503a' and 503b', further including first and second U-channels 504a' and 504b' and first and second bulbs 505a' and 505b' for detachably securing a plurality of cables. The sliding attachment member generally includes a male attachment member 506' and a female attachment member 507', which can be attached to a structure with, e.g., screws, through the first and second attachment holes 509a' and 509b'. The female attachment member 507' also includes a slot 508' running the entire length of the female attachment member 507' which is configured and dimensioned to be compatible with, e.g., mate with, the T-shaped form of the male attachment member 506'.

Figure 9A:
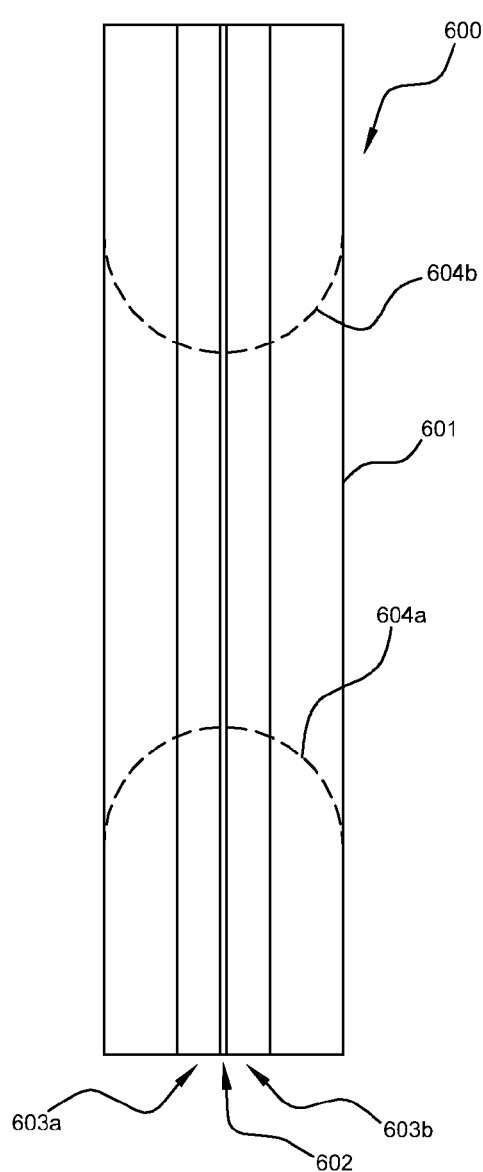
FIGS. 9(a) and (b) are bottom views of exemplary embodiments of a chamber path of a cable storage device.

With reference now to FIGS. 9(a) and (b), bottom views of exemplary embodiments of the at least one chamber path of a cable storage device are presented. In particular, the exemplary at least one chamber path can be, e.g., one continuous chamber path which runs the entire length of the chamber, two chamber paths connected at a point by a chamber path connector, or the like. The exemplary cable storage device 600 of FIG. 9(a) generally includes at least one chamber 601 and at least one continuous chamber path 602 which runs the entire length of the chamber 601. The cable storage device 600 can further include at least one coupler member configured as a first and second coupler element 603a and 603b which run the entire length of the chamber 601 in an opposed relation to each other. Although the first and second coupler elements 603a and 603b are depicted as having an opposed, spaced relation, i.e., the chamber path 602 creates a space between the first and second coupler elements 603a and 603b, it should be understood that the first and second coupler elements 603a and 603b can also be configured in an opposed, touching relation. Therefore, the chamber path 602 exists between the first and second coupler elements 603a and 603b and can be widened by spreading the sides of the chamber 601 apart. However, once the sides of the chamber 601 are released, the spring-like property, e.g., flexible and/or elastic memory, of the chamber 601 causes the sides of the chamber 601 to compress together to the default configuration, e.g., with the first and second coupler elements 603a and 603b in an opposed, touching relation. It should further be understood that the material of fabrication for the exemplary chamber 601 would generally not permit the spring-like property of the chamber 601 to wear and would therefore continue to maintain a uniform and strong pressure along the entire length of the chamber path 602. As discussed previously, the exemplary cable storage device 600 can further include first and second cutouts 604a and 604b and, although depicted as fabricated on the bottom of the chamber 601, the at least one path can be fabricated on any portion of the chamber 601, e.g., a side portion.

Figure 9B:
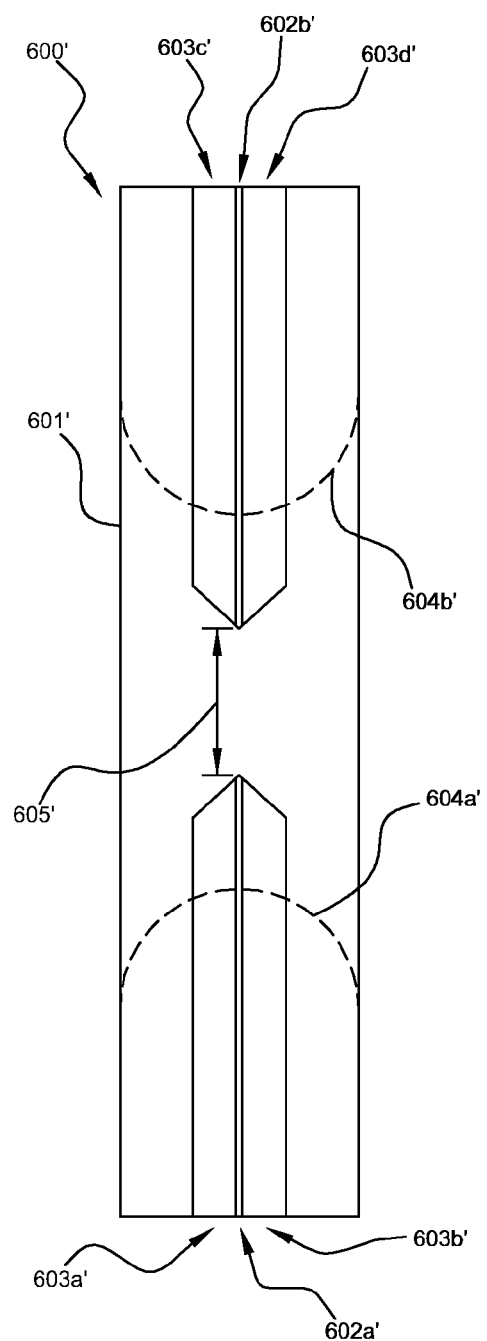

With specific reference to FIG. 9(b), the exemplary cable storage device 600' can include at least one chamber 601' and a first and second chamber path 602a' and 602b'. In particular, the first and second chamber paths 602a' and 602b' can be connected in, e.g., the middle of the chamber 601', by a chamber path connector 605' which can provide additional support for the chamber 601' material from losing its spring-like property and can further provide greater pressure on the elongated cables protruding out of the chamber 601' and through the first and second chamber paths 602a' and 602b' due to the shorter length of the first and second chamber paths 602a' and 602b'. It should be understood that the chamber path connector 605' can be configured and dimensioned in any size so as to provide the highest structural support to the chamber 601' while maintaining a secure hold on the elongated cables. The first and second chamber paths 602a' and 602b' can further include first and second coupler members configured as first, second, third and fourth coupler elements 603a', 603b', 603c' and 603d', respectively, which run the entire length of the first and second chamber paths 602a' and 602b'. In addition, the exemplary cable storage device 600' can include first and second cutouts 604a' and 604b'.

Figure 10:
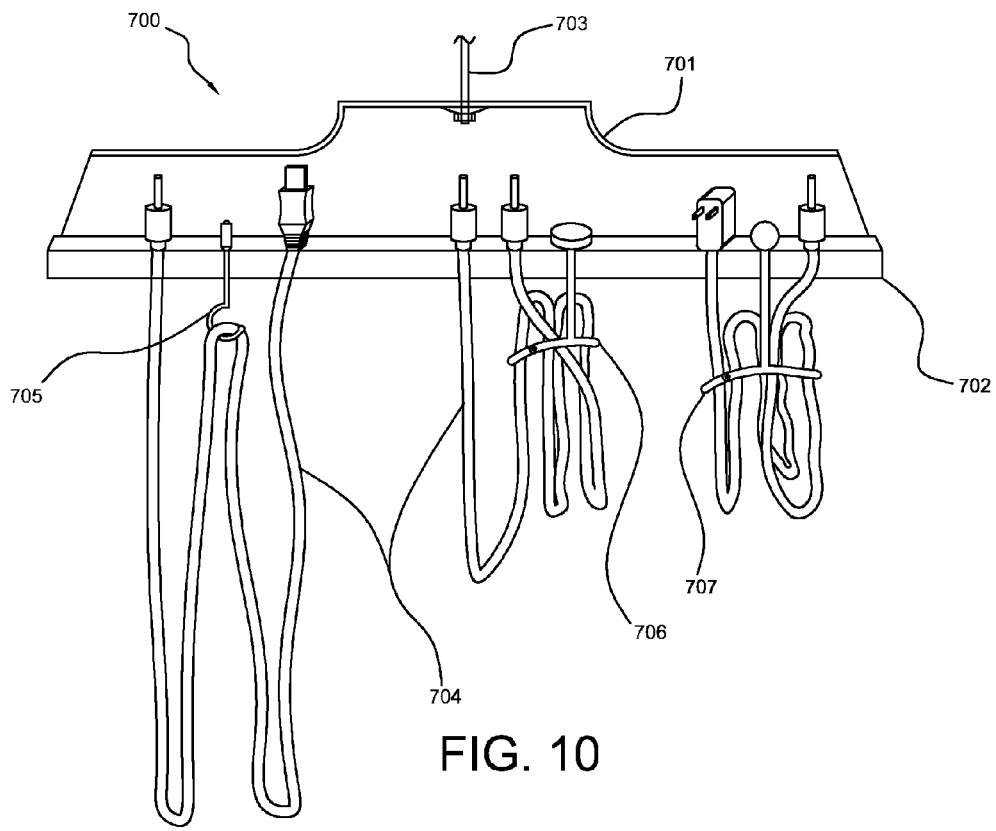
FIG. 10 is a side view of an exemplary embodiment of a cable storage device in use with additional cable storage features.

Turning now to FIG. 10, a side view of an exemplary embodiment of a cable storage device 700 in operation with additional cable storage features is presented. The exemplary cable storage device 700 generally includes at least one chamber 701, at least one chamber path (not visible from side view), and at least one coupler member 702 configured as first and second coupler elements. The chamber 701 can be connected to, e.g., a closet rod, by the hanger element 703 and can detachably secure a plurality of cables 704 along the length of the chamber path. As illustrated in FIG. 10, the plurality of cables 704 stored in the exemplary cable storage device 700 can be secured by, e.g., detachably securing both the first and second electrical connectors and/or insulating grips of a cable in the chamber 701 and above the coupler member, detachably securing only a first electrical connector and/or insulating grip of a cable in the chamber 701 and above the coupler member, thereby permitting the cable to hang freely below the coupler member and/or binding the cable portion below the coupler member, or the like.

Figure 11A:
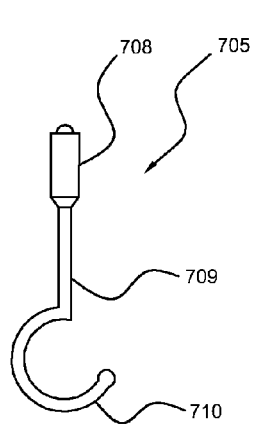
FIGS. 11(a)-(c) are exemplary embodiments of the additional cable storage features according to the present disclosure.

The additional exemplary cable storage features and/or accessories illustrated in FIG. 10 can include, e.g., a cable support hook 705, a first cable support tie 706, a second cable support tie 707, and the like, and can be implemented to further organize the plurality of cables stored in the exemplary cable storage devices discussed herein. With reference to FIG. 11(a), the cable support hook 705 can be configured as a fastening portion 708, an elongated connector 709 and a cable retention portion 710. The fastening portion 708 can be configured and dimensioned to act substantially similarly to the electrical connector and/or insulating grip portion of a cable. Specifically, when the fastening portion 708 has been inserted into a chamber above the coupler member with the elongated connector 709 protruding down through the chamber path as illustrated in FIG. 10, the fastening portion 708 acts to prevent the cable support hook 705 from undesired detachment out of the cable storage device by pressing against an inner surface of the chamber. The elongated connector 709 can be dimensioned in various lengths and connects the fastening portion 708 with the cable retention portion 710. The exemplary cable support hook 705 can include a cable retention portion 710 configured and dimensioned as, e.g., a hook, to permit the free-hanging portion of a cable stored in a cable storage device to be retained therein as depicted in FIG. 10.

Figure 11B:
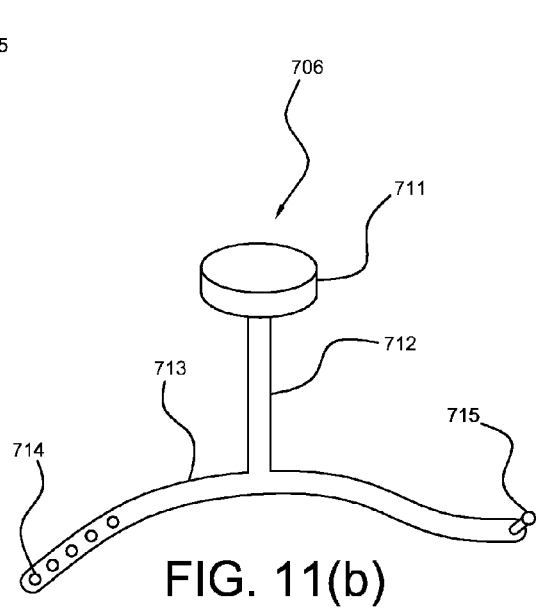
Figure 11C:
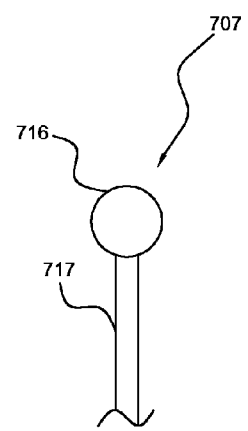

With reference to FIG. 11(b), the first cable support tie 706 can be configured as a fastening portion 711, an elongated connector 712 and a binding portion 713. The fastening portion 711 can be substantially similar to the fastening portion 708 of FIG. 11(a) and can further be configured and dimensioned as, e.g., a round and substantially flat disk, connected to an end of the elongated connector 712. The binding portion 713 can be fabricated from an elastic material, e.g., silicone, and can include a plurality of female binding openings 714 configured and dimensioned to mate with a male binding protrusion 715. As would be understood by those of ordinary skill in the art, the elastic property of the binding portion 713 permits a user to, e.g., bind, draw together, gather, or the like, a free end of a cable as illustrated in FIG. 10, wrap the binding portion 713 around the bound cable, and, based on the circumference of the bound cable portion, lock the binding portion 713 by mating the male binding protrusion 715 with an appropriate female binding opening 714 so as to maintain pressure around the bound cable and prevent the cable from unbinding during storage. FIG. 11(c) depicts the fastening portion 716 of an exemplary second cable support tie 707. In particular, the fastening portion 716 can be configured as, e.g., substantially round, disk-shaped, cylindrical, or the like. Therefore, a user can allow the free end of a cable stored in an exemplary cable storage device to hang freely and/or can utilize the exemplary cable storage features and/or accessories discussed herein to further organize and/or secure the free end of a cable.

Turning to FIGS. 12(a)-(d), side profiles of exemplary embodiments of the at least one coupler member of a cable storage device are depicted. In particular, the exemplary coupler members are provided to further illustrate the variety of configurations of the exemplary chambers and coupler members claimed by the present disclosure. For example, the exemplary chamber 801 of cable storage device 800 of FIG. 12(a) can be substantially circular in form and can include at least one chamber path 802. The exemplary cable storage device 800 can generally further include a coupler member configured as first and second coupler elements 803a and 803b, which in turn include first and second U-channels 804a and 804b and first and second elongated tabs 805a and 805b as discussed previously.

Figure 12A:
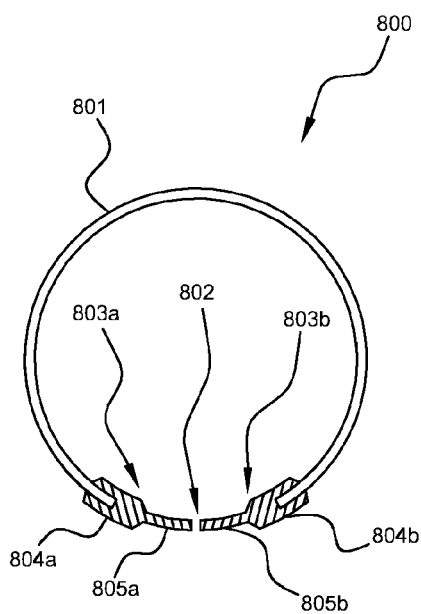
FIGS. 12(a)-(d) are exemplary embodiments of a coupler member of a cable storage device.
Figure 12B:
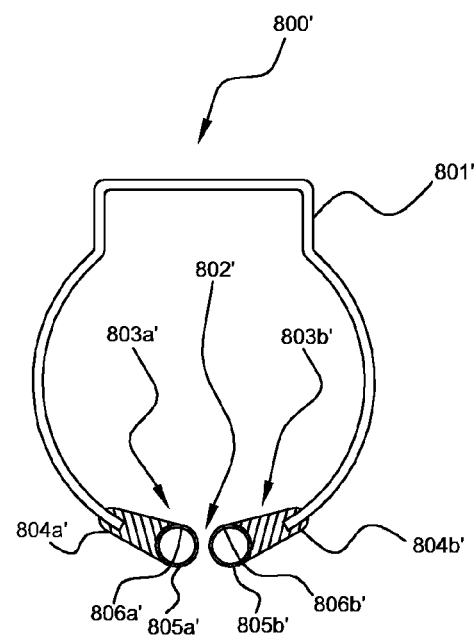

An exemplary chamber 801' of cable storage device 800' of FIG. 12(b) can have a form configured as a combination of a square/rectangle and circle and can include at least one chamber path 802'. The exemplary cable storage device 800' can generally further include a coupler member configured as first and second coupler elements 803a' and 803b', which in turn include first and second U-channels 804a' and 804b' and first and second bulbs 805a' and 805b' with first and second inner passages 806a' and 806b' as discussed previously.

Figure 12C:
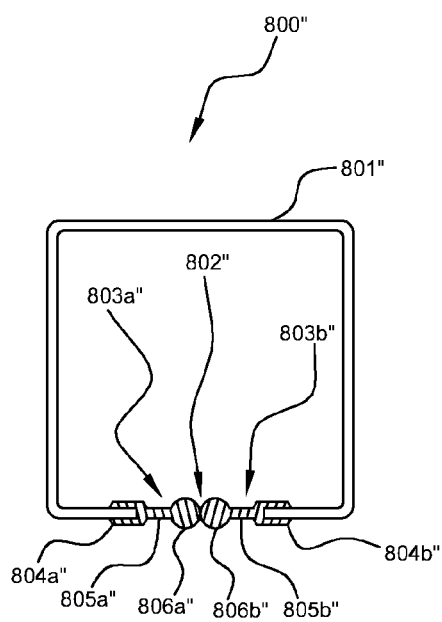

With reference to FIG. 12(c), an exemplary chamber 801" of a cable storage device 800" can have a substantially square and/or rectangular form and can include at least one chamber path 802". The exemplary cable storage device 800" can generally further include at least a first coupler member configured as first and second coupler elements 803a" and 803b". In particular, the first and second coupler elements 803a" and 803b" can include first and second U-channels 804a" and 804b", first and second coupler connecting members 805a" and 805b" and first and second bulbs 806a" and 806b". The first and second coupler elements 803a" and 804b" of FIG. 12(c) function substantially similarly to the first and second coupler elements discussed previously. However, rather than including first and second inner passages 806a' and 806b' as illustrated in FIG. 12(b), the first and second bulbs 806a" and 806b" can be solid, e.g., circular, square, rectangular, or the like, forms. Therefore, when a user pulls down on an elongated cord of a cable stored in the cable storage device 800", the first and second bulbs 806a" and 806b" can, e.g., cave in, bend elastically in a downward direction at the first and second coupler connecting members 805a" and 805b", or the like, to permit the cable of interest to pass out of the cable storage device 800" through the chamber path 802".

Figure 12D:
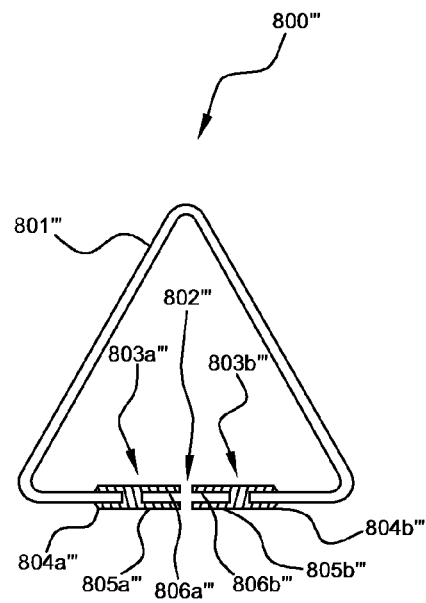

FIG. 12(d) illustrates an exemplary chamber 801''' of a cable storage device 800''' configured in a substantially triangular form and includes at least one chamber path 802'''. The exemplary cable storage device 800''' can generally further include at least a first coupler member configured as first and second coupler elements 803a''' and 803b''', which in turn include first and second U-channels 804a''' and 804b''' and first and second pairs of elongated tabs 805a''' and 805b'''. In particular, the first and second pairs of elongated tabs 805a''' and 805b''' can be spaced apart by first and second elongated tab inner passages 806a''' and 806b''', which permit the first and second pairs of elongated tabs 805a''' and 805b''' to have a spring-like, e.g., elastic, property, thereby allowing a cable of interest to pass through the chamber path 802''' and subsequently "springing" back to the default, substantially horizontal orientation to maintain a continuous and secure hold of additional cables stored in the exemplary cable storage device 800'''.

Figure 13:
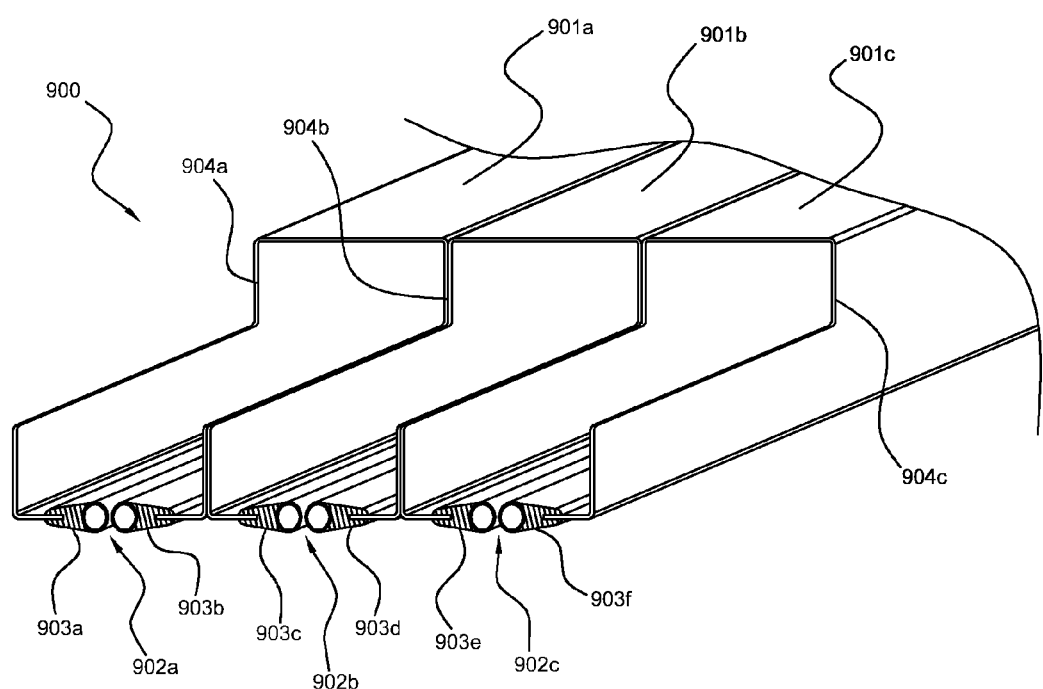
FIG. 13 is a perspective view of an exemplary embodiment of a multi-chamber cable storage device.

Turning now to FIG. 13, a perspective view of an exemplary embodiment of a multi-chamber cable storage device 800 is presented. In particular, the exemplary cable storage device 900 generally includes a plurality of exemplary chambers 901a, 901b and 901c, each having at least one chamber path 902a, 902b and 902c. Although illustrated with three chambers 901a, 901b and 901c, it should be understood that the exemplary multi-chamber cable storage device 800 can include any number of chambers, e.g., one, two, three, four, five and the like. Each of the plurality of chambers 901a, 901b and 901c generally includes at least a first coupler member configured as first and second coupler elements 903a, 903b, 903c, 903d, 903e and 903f, respectively. The plurality of chambers 901a, 901b and 901c can further include cutouts 904a, 904b and 904c. As would be understood by those of ordinary skill in the art, any of the exemplary embodiments of cable storage devices discussed herein can be grouped, e.g., secured, together as illustrated in FIG. 13 to provide a plurality of chambers and/or chamber paths for housing/storing/organizing a greater amount of cables.

Figure 14:
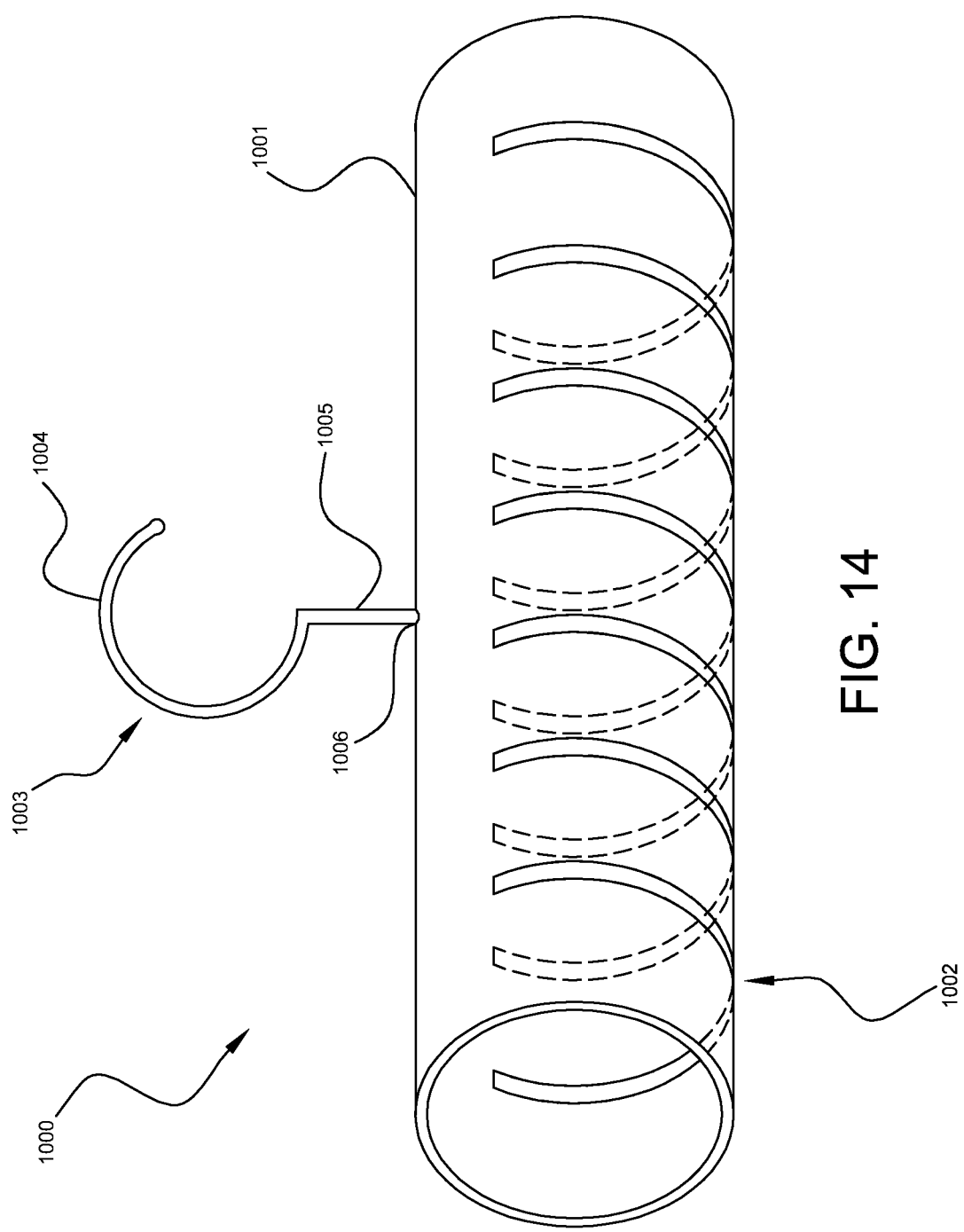
FIG. 14 is a perspective view of an exemplary embodiment of the cable storage device with an alternative chamber path.

Turning now to FIG. 14, a perspective view of another exemplary embodiment of a cable storage device 1000 is illustrated, generally including at least one chamber 1001 and at least one chamber path 1002. The exemplary chamber 1001 can be configured as, e.g., substantially circular, square, rectangular, a combination of said forms, and the like. The at least one chamber path 1002 can be oriented to pass through the chamber 1001 substantially parallel to the sides of the chamber 1001. However, it should be understood that the at least one chamber path 1002 can be configured to pass through the chamber 1001, e.g., helically, diagonally, at an angle, or the like. Further, the at least one chamber path 1002 can be configured and dimensioned to pass through, e.g., half of the circumference of the chamber 1001, through the entire circumference of the chamber 1001, any distance of the circumference of the chamber 1001, and the like. Thus, the spring-like property of the material of the chamber 1001 can permit a user to widen the chamber path 1002 for insertion and/or removal of a cable and further "snaps" the chamber path 1002 back to a default orientation to provide substantial pressure against cables stored in the cable storage device 1000.

For example, in a helical configuration of the at least one chamber path 1002, the at least one chamber path 1002 can pass continuously through the chamber 1001 from one side of the chamber 1001 to the other side of the chamber 1001 in a diagonal orientation. The exemplary chamber 1001 can then be secured together on a top portion of the chamber 1001 by, e.g., a strip of material (not shown) stiff enough to bind the top portion of the chamber 1001 together, while permitting the chamber 1001 to spread apart sufficiently to permit an electrical connector and/or insulating grip of a cable to pass through the chamber path 1002 unimpeded. Although not illustrated, it should be understood that the at least one chamber path 1002 can optionally include at least a first coupler member of the configurations described previously and/or a soft, protective lining to prevent cable damage running the entire length of the at least one chamber path 1002.

The exemplary cable storage device 1000 depicted in FIG. 14 includes at least one chamber 1001 and a plurality of chamber paths 1002. The plurality of chamber paths 1002 permit a user to secure a greater amount of cables in each chamber path 1002. In particular, cables can be inserted substantially perpendicular to the chamber path 1002, e.g., from the bottom of the chamber 1001, side of the chamber 1001, or the like. Similar to exemplary attachment means discussed previously, the exemplary cable storage device 1000 can also include a hanger element 1003 configured as a hook 1004 and an elongated shaft 1005 for attachment to the chamber 1001 through a hanger element opening 1006. Thus, the exemplary cable storage device 1000 can be attached to, e.g., a closet rod.

Figure 15A:
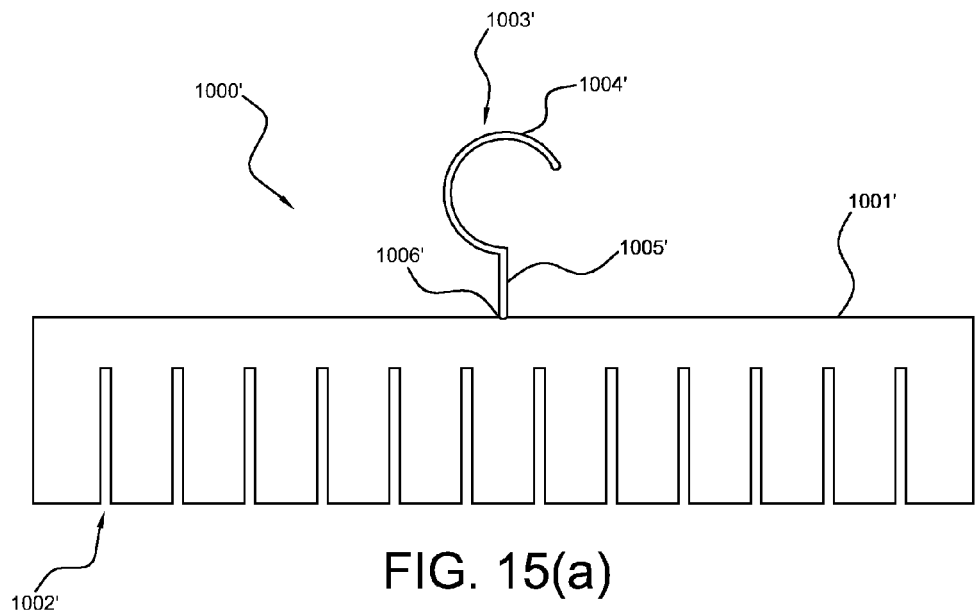
FIGS. 15(a) and (b) are side views of an exemplary embodiment of the cable storage device with an alternative chamber path.
Figure 15B:
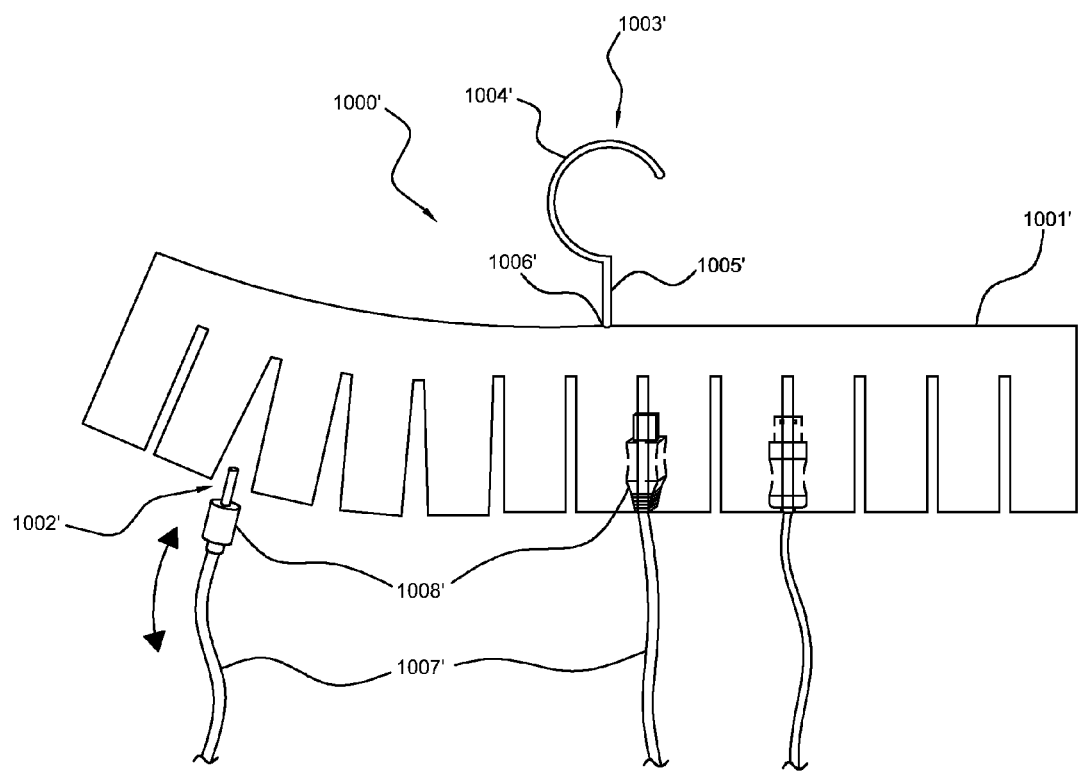

Turning now to FIGS. 15(*a*) and (*b*), side views of an exemplary embodiment of the cable storage device 1000' are presented. In particular, the exemplary cable storage device 1000' generally includes at least one chamber 1001' and at least one chamber path 1002'. The exemplary cable storage device 1000' can further include a hanger element 1003' configured as a hook 1004' and an elongated shaft 1005' for attachment to the chamber 1001' through a hanger element opening 1006'.

With specific reference to FIG. 15(*b*), the exemplary cable storage device 1000' is depicted in operation. In particular, the elastic property of the material of fabrication of the chamber 1001' permits the plurality of chamber paths 1002' to be widened for insertion and/or removal of a plurality of cables. The top cable portions 1008', e.g., the electrical connector and insulating grip, are generally secured inside the chamber 1001' above the chamber path 1002' while the elongated cords 1007' of the plurality of cables pass through the chamber path 1002'. Specifically, the chamber path 1002' and the coupler members provide pressure against the elongate cords 1007' to detachably secure the plurality of cables inside the chamber 1001', while the larger/wider top cable portions 1008' prevent the plurality of cables from undesired detachment from the cable storage device 1000' due to the support from the inner surface of the chamber 1001'.

Figure 16A:
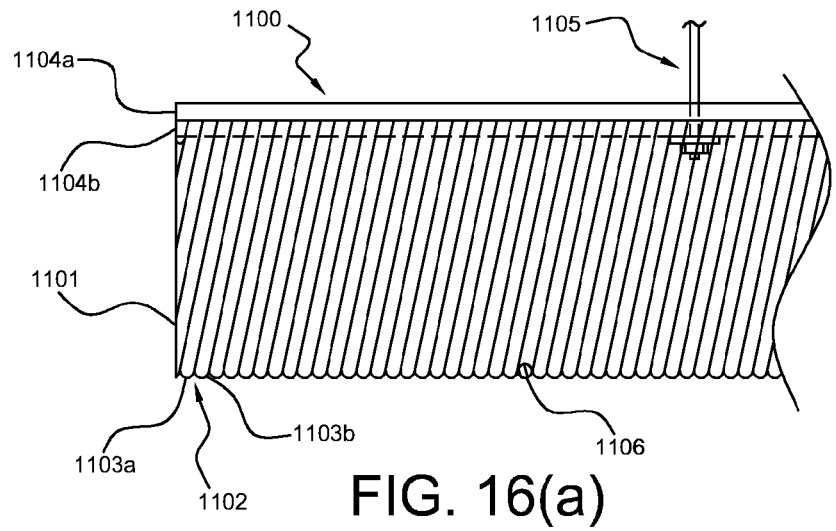
FIGS. 16(a)-(c) are exemplary embodiments of an alternative cable storage device.
Figure 16B:
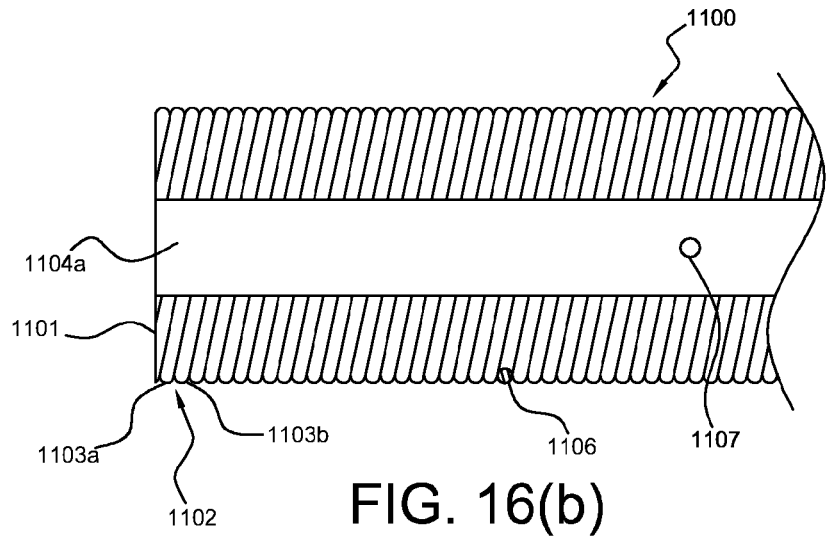
Figure 16C:
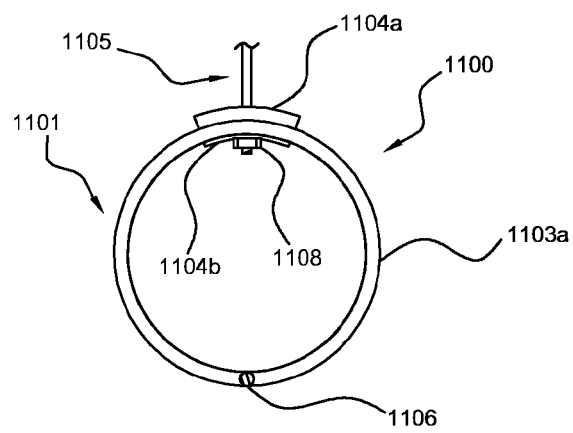

Turning now to FIGS. 16(*a*)-(*c*), an alternative exemplary cable storage device 1100 is illustrated. FIG. 16(*a*) shows a side view of the exemplary cable storage device 1100. In particular, the exemplary cable storage device 1100 generally includes at least one chamber 1101 and at least one chamber path 1102. As depicted in FIGS. 16(*a*)-(*c*), the chamber 1101 can be configured as, e.g., a plastic and/or metal spring/coil held together at a top portion of the chamber 1101 by at least a first stabilizing member 1104*a*. The chamber 1101 can be further held/bound together to prevent the spring/coil material from unwinding by a second stabilizing member 1104*b* located on the top inner surface of the chamber 1101. The first and second stabilizing members 1104*a* and 1104*b* can be substantially rigid enough to reinforce/support the spring-like/flexible coil material of the chamber 1101 and can further be sufficiently flexible to permit a user to bend the first and second stabilizing members 1104*a* and 1104*b* in an upward direction relative to the generally horizontal direction/orientation of the first and second stabilizing members 1104*a* and 1104*b*, thereby widening the chamber path 1101 for insertion and/or removal of a cable.

The exemplary cable storage device 1100 generally further includes at least one coupler member configured as first and second coupler elements 1103*a* and 1103*b*. It should be understood that the exemplary cable storage device 1100 and the alternative exemplary cable storage devices described herein can include a plurality of coupler members and chamber paths 1102. The first and second coupler elements 1103*a* and 1003*b* are illustrated as first and second coil elements of the chamber 1101 and can be oriented in a substantially touching relation. The plurality of coupler members can thus form the elongated chamber 1101. In operation, a user can bend and/or flex the first and second stabilizing members 1104*a* and 1104*b* in an upward direction, thereby causing the first and second coupler elements 1103*a* and 1103*b* to spread apart and widen the chamber path 1102 for insertion and/or removal of a cable. When an electrical connector and/or insulating grip of a cable has been inserted into the chamber 1101 above the chamber path 1102, the first and second stabilizing members 1104*a* and 1104*b* can be released, thereby permitting the first and second coupler elements 1103*a* and 1103*b* to grasp/press on the elongated cord of the cable, detachably securing the cable, while an inner surface of the chamber 1101 prevents the electrical connector and/or insulating grip of the cable from undesired detachment from the cable storage device 1100.

As depicted by cross-section 1106, the exemplary coil elements can be substantially solid in nature, although a hollow coil and/or tube can also be implemented. Thus, rather than bending the first and second stabilizing members 1104*a* and 1104*b* to remove a cable of interest, a user can pull on an elongated cord of the cable of interest and the flexible property of the hollow coil can permit the coil to cave in, thus creating a widened chamber path 1102 for the electrical connector and/or insulating grip of the cable to pass through unimpeded. Once the cable of interest has been removed from the cable storage device 1100, the hollow coil can spring back to the "default" substantially circular form, thereby closing the chamber path 1102 space to maintain a continuous pressure on other cables stored in the cable storage device 1100. As discussed previously, the exemplary cable storage device 1100 can further include a hanger element 1105 for, e.g., detachably securing said device to a closet rod.

With reference to FIG. 16(*b*), a top view of the exemplary cable storage device 1100 is illustrated. The first stabilizing member 1104*a* generally includes a hanger element opening 1107 for attaching the hanger element 1105 to the chamber 1101. FIG. 16(*c*) shows a side view of the exemplary cable storage device 1100. In particular, although the chamber 1101 is depicted as substantially circular, it should be understood that the chamber 1101 can be configured in a plurality of forms, e.g., circular, square, triangular, rectangular, or the like. Further, the chamber 1101 can be secured together by the first and second stabilizing members 1104*a* and 1104*b* and the hanger element 1105 can be attached to the chamber 1101 with a nut 1108.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A cable storage device, comprising:
   a chamber;
   a chamber path defining an opening in the chamber, the opening separating a first chamber wall and a second chamber wall of the chamber, and
   a first coupler element attached to the first chamber wall and a second coupler element attached to the second chamber wall, the first and second coupler elements being oriented in a confronting relationship relative to each other,
   wherein the first and second coupler elements are fabricated from a material which exhibits a greater flexibility than a material of fabrication of the chamber,
   wherein the chamber is configured to detachably secure a cable in the chamber path with the first and second coupler elements; and
   wherein due to a force imparted by the first and second chamber walls, application of pressure on the first and second coupler elements at a portion along a length of the first and second coupler elements causes the first and second coupler elements to yield at the portion to widen the chamber path between the first and second coupler elements at the portion, while maintaining a width of the chamber path between the first and second coupler elements along the remaining length of the first and second coupler elements.

2. The device of claim 1, wherein the first coupler element includes a first U-channel for attachment of the first coupler element to the first chamber wall and the second coupler element includes a second U-channel for attachment of the second coupler element to the second chamber wall.

3. The device of claim 2, wherein the first U-channel receives therein a portion of the first chamber wall and the second U-channel receives therein a portion of the second chamber wall.

4. The device of claim 1, wherein each of the first and second coupler elements includes a bulb with a hollow inner passage extending an entire length of each of the first and second coupler elements.

5. The device of claim 4, wherein application of pressure on the bulb causes the bulb to yield inwardly into the hollow inner passage, and wherein removal of the pressure from the bulb causes the bulb to spring back to a default configuration.

6. The device of claim 1, wherein each of the first and second coupler elements includes an elongated tab, the elongated tab of the first coupler element extending away from the first chamber wall and the elongated tab of the second coupler element extending away from the second chamber wall.

7. The device of claim 1, wherein each of the first and second coupler elements includes a pair of elongated tabs with a hollow path therebetween.

8. The device of claim 1, comprising a second chamber path defining a second opening in the chamber, the opening separating a third chamber wall and a fourth chamber wall of the chamber.

9. The device of claim 8, wherein the second chamber path is connected to the first chamber path by a chamber path connector located at a central portion of a chamber length.

10. The device of claim 8, wherein the first and second chamber paths each extend a partial distance of a chamber length.

11. The device of claim 8, wherein the first and second chamber paths extend parallel relative to a chamber length and relative to each other.

12. The device of claim 1, comprising a hook-shaped hanger element attached to and protruding from the chamber.

13. The device of claim 1, wherein the first and second coupler elements are oriented in an opposed and touching relation across the chamber path.

14. The device of claim 1, wherein the first and second coupler elements at least partially yield when the cable is detachably secured in the chamber path.

15. The device of claim 1, wherein the first and second coupler elements bend relative to the first and second chamber walls when the cable is detachably secured in the chamber path.

16. The device of claim 1, comprising a sliding wall attachment attached to the chamber for detachably securing the chamber to a surface.

17. The device of claim 1, wherein application of pressure on the first and second coupler elements at the portion along the length of the first and second coupler elements causes the first and second coupler elements to yield at the portion to widen the chamber path, while maintaining a force distribution with the first and second coupler elements along the remaining length of the first and second coupler elements.

18. A cable storage device, comprising:
   a chamber; and
   a coupler member, the coupler member including a first coupler element and a second coupler element,
   wherein the first and second coupler elements are fabricated from a material which exhibits a greater flexibility than a material of fabrication of the chamber,
   wherein the coupler member is configured to detachably secure a cable with the first and second coupler elements, and
   wherein due to a force imparted by the chamber, application of pressure on the first and second coupler elements at a portion along a length of the first and second coupler elements causes the first and second coupler elements to yield at the portion to widen a path between the first and second coupler elements at the portion, while maintaining a width of the path between the first and second coupler elements along the remaining length of the first and second coupler elements.

19. A method of cable storage, comprising:
   introducing a cable into a chamber,
   wherein the chamber comprises (i) a chamber path defining an opening in the chamber, the opening separating a first chamber wall and a second chamber wall of the chamber, (ii) a first coupler element attached to the first chamber wall, and (iii) a second coupler element attached to the second chamber wall, the first and second coupler elements being oriented in a confronting relationship relative to each other, and the first and second coupler elements being fabricated from a material which exhibits a greater flexibility than a material of fabrication of the chamber; and
   detachably securing the cable in the chamber path with the first and second coupler elements,
   wherein due to a force imparted by the first and second chamber walls, application of pressure on the first and second coupler elements at a portion along a length of the first and second coupler elements causes the first and second coupler elements to yield at the portion to widen the chamber path between the first and second coupler elements at the portion, while maintaining a width of the chamber path between the first and second coupler elements along the remaining length of the first and second coupler elements.

20. A method of cable storage, comprising:

introducing a cable into a chamber, wherein the chamber comprises a coupler member, the coupler member including a first coupler element and a second coupler element, the first and second coupler elements being fabricated from a material exhibiting a greater flexibility than a material of fabrication of the chamber; and detachably securing the cable with the first and second coupler elements of the coupler member, wherein due to a force imparted by the chamber, application of pressure on the first and second coupler elements at a portion along a length of the first and second coupler elements causes the first and second coupler elements to yield at the portion to widen a path between the first and second coupler elements at the portion, while maintaining a width of the path between the first and second coupler elements along the remaining length of the first and second coupler elements.

* * * * *